(12) United States Patent
Morel et al.

(10) Patent No.: US 6,177,641 B1
(45) Date of Patent: Jan. 23, 2001

(54) PLUG-IN CIRCUIT BREAKER DISCHARGE AND DISENGAGEMENT ENERGY STORAGE CONTROL DEVICE USED DURING EXTRACTION OF BREAKER

(75) Inventors: Robert Morel, Herbeys; Claude Grelier, Grenoble; Eric Pinero, Seyssinet, all of (FR)

(73) Assignee: Schneider Electric SA (FR)

( * ) Notice: Under 35 U.S.C. 154(b), the term of this patent shall be extended for 0 days.

(21) Appl. No.: 09/281,788

(22) Filed: Mar. 31, 1999

(30) Foreign Application Priority Data

Apr. 17, 1998 (FR) .................................................... 9805119

(51) Int. Cl.$^7$ .................................................. H01H 9/20
(52) U.S. Cl. ...................................... 200/50.26; 200/400
(58) Field of Search .................. 200/400, 50.21–50.28, 200/318–237; 361/605–624

(56) References Cited

U.S. PATENT DOCUMENTS

| | | | |
|---|---|---|---|
| 2,829,737 | * | 4/1958 | Favre ................................ 200/564 X |
| 3,084,238 | * | 4/1963 | Baskerville .......................... 200/400 |
| 4,004,113 | * | 1/1977 | Ericson et al. .................... 200/50.26 |
| 4,112,269 | * | 9/1978 | Nelson et al. ..................... 200/50.26 |
| 4,137,436 | * | 1/1979 | Barkan et al. ....................... 200/400 |
| 4,703,137 | * | 10/1987 | Bohnen et al. ................... 200/50.25 |
| 4,713,508 | * | 12/1987 | Baginski et al. ................. 200/321 X |

FOREIGN PATENT DOCUMENTS

| | | |
|---|---|---|
| 0 048 042 A2 | 3/1982 | (EP) . |
| 0 222 645 A1 | 5/1987 | (EP) . |
| 0 227 586 A1 | 7/1987 | (EP) . |
| 799665 | 8/1958 | (GB) . |

* cited by examiner

Primary Examiner—J. R. Scott
(74) Attorney, Agent, or Firm—Parkhurst & Wendel, L.L.P.

(57) ABSTRACT

The invention relates to a plug-in circuit breaker and has the object of preventing no-load discharges of the closing mechanism when extraction of the circuit breaker is performed. The drive mechanism of the circuit breaker loading and closing mechanism comprises a trip mechanism which is able to move from a closed state wherein actuation of an oscillating lever is designed to move the closing spring to its loaded state, to a tripped state wherein actuation of the oscillating lever is designed to prevent movement of the closing spring to its loaded state. This trip mechanism causes either disengagement of the oscillating lever or neutralization of a free-wheel coupling of the drive mechanism. The circuit breaker is moreover equipped with opening and closing controls causing an opening, closing, opening cycle when extraction is performed.

10 Claims, 21 Drawing Sheets

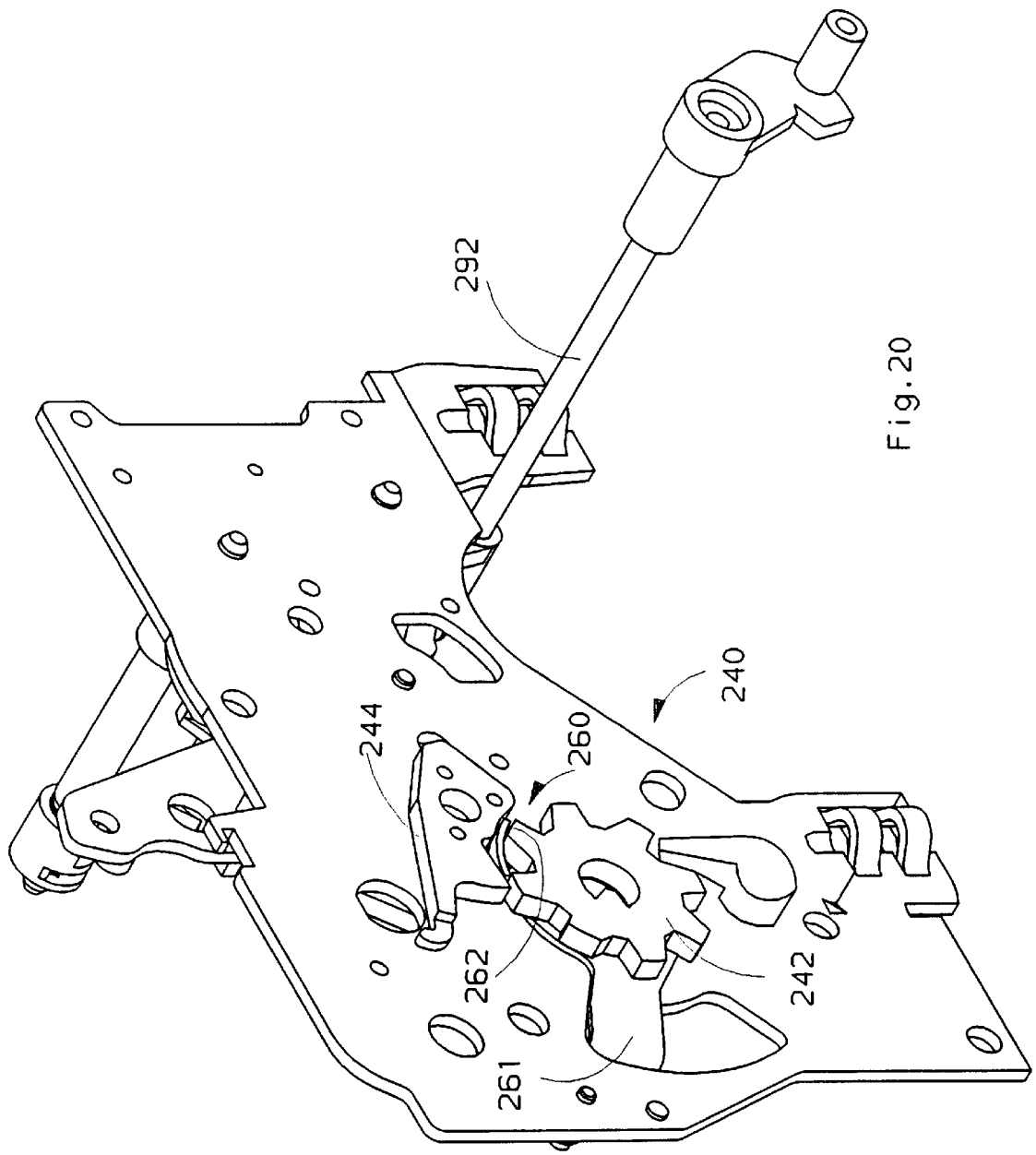

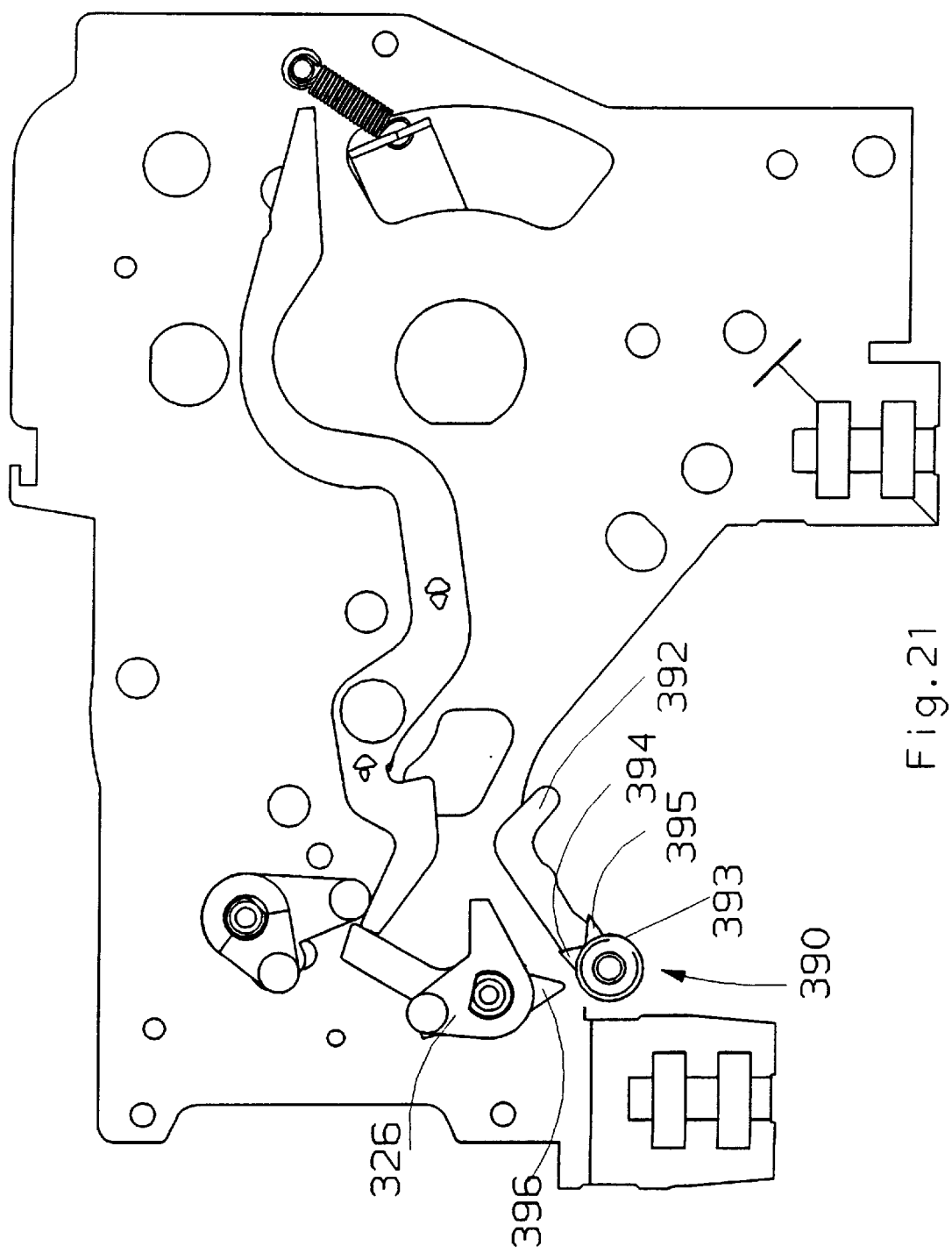

PLUG-IN CIRCUIT BREAKER DISCHARGE AND DISENGAGEMENT ENERGY STORAGE CONTROL DEVICE USED DURING EXTRACTION OF BREAKER

BACKGROUND OF THE INVENTION

The invention relates to a circuit breaker of the kind described in the document EP-A-0,222,645, comprising at least one pair of contacts at least one of which is movable and can take with respect to the other contact a closed position corresponding to mechanical and electrical contact and an open position, this circuit breaker being of the type equipped with a closing device provided with an energy storage device.

A pole 10 of a known circuit breaker 1 of this type and its opening mechanism 20 have been represented in FIGS. 1 to 3. FIG. 4 represents a loading and closing mechanism 30 of this circuit breaker, the unloaded position. FIG. 5 represents the circuit breaker's loading and closing mechanism in the loaded position.

The pole 10 comprises in conventional manner a pair of breaking contacts 11, 12. The contact 11 is stationary and the contact 12 is mounted pivotally between an open position which can be seen in FIG. 1, in which it is separated from the stationary contact, and a closed position which can be seen in FIG. 3, in which mechanical and electrical contact between the contacts 11 and 12 is established. The pole 10 also comprises an arc extinguishing chamber 19 and a pair of main terminals 14, 15 extending outwards from the rear face of the circuit breaker 1 and designed to engage by means of engagement contacts on connection terminal strips. The circuit breaker 1 comprises a plurality of poles 10 arranged in parallel planes, perpendicular to a pole shaft 16 which is common to these poles. The closing or opening order of the poles is transmitted to each movable contact 12 by means of a connecting rod 13 operating in conjunction with a lever securedly affixed to the pole shaft 16.

The opening mechanism 20 comprises a toggle mechanism 21 with two small rods articulated on one another by a pivoting spindle. One of these rods is mechanically coupled to a crank 23 of the pole shaft common to all the poles, this crank moreover forming one of the levers operating in conjunction with the rods 13. The other rod is articulated in rotation on a trip hook 22 pivotally mounted on a fixed spindle. An opening spring 24 is secured between the crank 23 and a fixed securing pin and tends to return the crank 23 to its open position shown in FIG. 1, in the counter-clockwise direction in this figure. An opening catch 25 formed by a lever pivoting around a fixed spindle is controlled by an opening latch 26 in the shape of a half-moon. The catch 25 is biased by a spring in a direction in which it is moved away from the half-moon and towards the hook 22. The opening latch 26 is returned to its latched position. In other words, the half-moon is biased by a spring in a direction opposing rotation of the catch 25 as can be seen in FIGS. 2 and 3. A roller 27 arranged on the opening catch 25 between its ends is designed to operate in conjunction with a V-shaped recess of the trip hook 22, in the positions of FIGS. 2 and 3. The hook 22 is biased by a spring in a counter-clockwise direction in FIG. 1, tending to shorten the distance between the articulation axis of the toggle mechanism 21 on the hook 22 and the articulation axis of the toggle mechanism 21 on the crank 23.

The loading and closing mechanism 30 is represented in FIG. 4 in its unloaded state. This mechanism comprises a drive lever 31 pivotally mounted around a fixed spindle 32.

A flexible energy storage device comprising at least one closing spring 34 is pivotally mounted on the side of one of its ends on a fixed point and on the side of the other of its ends to a finger of the drive lever 31. The drive lever bears a roller 33 designed to cooperate with a loading cam 46 keyed onto a shaft 41 of a drive mechanism. The cam 46 comprises a roller 47 designed to operate in conjunction with a closing ratchet 36 which is pivotally mounted around a fixed spindle 37. A closing latch 38 in the shape of a half-moon is designed to lock the ratchet 36 in the position of FIG. 5. This latch 38 is flexibly biased by a spring to its closed position. The ratchet 36 is itself biased by a spring to its latched position represented in FIG. 5.

The opening mechanism and the loading and closing mechanism are mounted on one or more flanges constituting a fixed support and the two planes of projection of FIGS. 1 to 3 on the one hand and of FIGS. 4 and 5 on the other hand are disposed approximately parallel to one another. A link between the opening mechanism and the loading and closing mechanism is achieved by a finger 39 securedly united to the drive lever 31 and designed to operate in conjunction with the toggle mechanism 21, this finger extending according to an axis essentially perpendicular to the sectional planes of FIGS. 1 and 4. The opening mechanism and the loading and closing mechanism are both provided with end of travel stops which can be seen in the figures.

The circuit breaker opening and closing sequences can be schematized from FIGS. 1 to 5. In FIG. 4, the loading and closing mechanism is in its unloaded state: the closing spring 34 is relaxed; the roller 47 is pressing against the closing ratchet 36; the closing half-moon is open and also operates in conjunction with the closing ratchet 36. Movement from the unloaded state of FIG. 4 to the loaded state of FIG. 5 is achieved by clockwise rotation of the shaft 41 and cam 46 in the figures. In a first stage, the roller 47 releases the ratchet 36 which moves due to the force of its return spring to the position represented in FIG. 5. At the same time, the closing latch 38 recloses due to the action of its return spring and latches the ratchet 36 in position. The cam 46, continuing its rotation, comes into contact with the roller 33 of the drive lever 31, driving the latter in clockwise rotation to the position of FIG. 5. In its rotation, the drive lever loads the spring 34. In the position reached in FIG. 5, the cam has passed a dead point and has become receiving: the roller 33 has reached a zone of the cam in which it biases the latter clockwise, whereas the ratchet 36 forms a stop for the roller 47 and opposes any movement in the clockwise direction. The mechanism is then loaded.

Impulse relaxation of the closing spring 34 is obtained by unlocking the latch 38. This unlocking in fact releases the ratchet 36 biased by the roller 47 of the cam 46. The cam 46, itself biased by the roller 33 of the drive lever 31, rotates clockwise and totally releases the roller 33, resulting in counter-clockwise impulse rotation of the drive lever due to the impulse of the relaxing spring 33. At the end of the closing spring relaxation phase the mechanism is in the position shown in FIG. 4.

The closing spring loading phase and relaxation phase can be performed whatever the state of the opening mechanism. During the loading phase, the finger 39 pivots clockwise around the spindle 32. In the opposite manner, during the relaxation phase, the finger 39 pivots counter-clockwise and returns to its previous position.

These pivotings of the finger 39 have different effects on the opening mechanism depending on whether the latter is initially open or closed.

The unloaded open switchgear apparatus is represented in FIG. 1. The finger 39 is then pressing against a recess of one of the rods of the toggle mechanism 21 and opposes counter-clockwise rotation of the hook 22 due to the biasing effect of its return spring. Rotation of the finger 39 during the loading phase releases the toggle mechanism 21 and the hook 22 which progressively move to the position represented in FIG. 2 due to the biasing effect of the return spring of the hook: the hook 22 has rotated counter-clockwise and the distance between the ends of the toggle mechanism has decreased. The hook, by operating in conjunction with the stop 27 of the catch 25, allows counter-clockwise rotation of the catch 25 due to the biasing effect of its return spring until the catch passes beyond the half-moon of the opening latch 26. The latch then recloses due to the biasing effect of its own return spring and prevents the opening catch 25 from returning in the clockwise direction. The hook 22, when it has completed its rotation, places itself in such a way that its V-shaped recess operates in conjunction with the stop 27 of the catch 25 and is blocked in position by the latter, as represented in FIG. 2. The opening mechanism is then in the loaded open position.

Relaxation of the closing spring causes, as has already been said, rotation of the finger 39 which follows a reverse trajectory to the previous one. In doing this, the finger 39 drives one of the small rods of the toggle mechanism 21. The hook 22 is blocked in position by the stop 27 of the opening catch 25. The articulation axis of the toggle mechanism 21 on the hook 22 therefore remains fixed and it is the articulation axis of the toggle mechanism on the crank 23 which is forced to move, thus moving the crank 23, pole shaft 16, levers, rods 13 and movable contacts 12 of the different poles to their closed position. The opening spring 24 is for its part automatically loaded when closing of the poles takes place due to the movement of its point of attachment to the crank 23. At the end of this phase, the switchgear apparatus is closed and unloaded. The opening mechanism is in the position represented in FIG. 3, with the finger 39 in its position shown by a broken line. The toggle mechanism 21 has moved slightly past its dead point, which means that the articulation axis between the toggle mechanism rods has passed from one side to the other of a plane containing the other two articulation axes of the toggle mechanism, that one of the rods is pressing against an end of travel stop 28 securely affixed to the hook 22 and that there is no longer any cooperation between the finger 39 and the toggle mechanism 21.

If, from the unloaded closed position, the opening latch 26 is unlatched, the position is of FIG. 1 is reached in the following manner: opening of the half-moon of the latch 26 releases the opening catch 25 and consequently the hook 22. Due to the biasing of the opening spring 24, the toggle mechanism 21 biases the hook 22 both at the level of its common articulation with the hook 22 and at the level of the end of travel stop 28. This biasing results globally in a torque causing clockwise rotation of the hook 22, which lowers the articulation axis of the toggle mechanism on the hook, makes the toggle mechanism pass via its dead point again and enables it to fold back to the position of FIG. 1, the toggle mechanism 21 coming up against the stop formed by the finger 39 in the unloaded position.

Starting again from the unloaded closed position, the loading mechanism can also be reset whereas the poles remain closed, which moves the mechanism to its loaded closed position and the finger 39 to the position indicated by an unbroken line in FIG. 3. Following this resetting operation, opening of the opening latch moves the opening mechanism to the loaded open position of FIG. 2 by a sequence similar to the previously described opening sequence, except for the fact that the folding movement of the toggle mechanism is not stopped by the stop and can be pursued, driving with it the hook 22, which again enables counter-clockwise rotation of the catch 25 due to the biasing of its return spring, until the catch has passed the half-moon of the opening latch 26. The latch 26 then recloses due to the biasing of its return spring and the hook, on completing its rotation, replaces itself in the position represented in FIG. 2. The opening mechanism is then in the loaded open position.

It can therefore be seen that, from the loaded closed position of FIG. 3, it is possible to consecutively perform an opening which leads to the position of FIG. 2, a closing which leads to the position of FIG. 3, in broken lines, and an opening which leads to the position of FIG. 1, without resetting the loading device. This opening, closing, opening (OCO) sequence is characteristic of this type of circuit breaker.

The invention relates more precisely to this type of circuit breaker, when it is mounted in its plug-in version, that is to say integrated in a switchgear unit comprising a frame called the fixed frame, and a circuit breaker movable with respect to the fixed frame between an extracted position and a plugged-in position. The frame is generally box-shaped and comprises an opening on the front panel enabling the circuit breaker to be inserted, as well as slides for support and guiding thereof between the extracted position and the plugged-in position. The extracted position is that in which the circuit breaker can be removed from the frame slides. The plugged-in position is that in which the circuit breaker terminals are secured to the corresponding terminals of the frame, themselves connected to the electrical circuit, for example by an external busbar. Intermediate positions between the extracted position and the plugged-in position are generally distinguished, in particular, starting from the extracted position, a position called the plugged-out position in which no electrical contact exists between the circuit breaker and frame, but from which a kinematic transmission system becomes active for subsequent movement of the circuit breaker to the plugged-in position, and a position called the test position in which the main circuits of the circuit breaker, i.e. the terminals referred to above, are disconnected, but auxiliary electrical circuits are connected to the frame. Certain intermediate positions may be identical to one another or to the extreme positions: for example, the extracted position may be the same as the plugged-out position, or the plugged-out position be the same as the test position. The kinematic transmission system serving the purpose of moving the movable part of the circuit breaker between the plugged-out position and the plugged-in position is generally driven by a removable crank operated by the operator. It may also be motor-driven.

For this type of switchgear in its plug-in version, usage imposes that the handling operations enabling the circuit breaker to be extracted from its frame give rise to automatic sequences so that the circuit breaker at the end of the extraction phase is open and unloaded. This usage corresponds to a concern for preventing any risk of accident for the operator who may have to handle or reomve the circuit breaker.

Traditionally, to achieve this result, manufacturers ensure that the opening latch and closing latch are both placed in their unlatched position so long as the switchgear apparatus is not between the plugged-out position and the plugged-in position. A switchgear apparatus of this type is described for example in the document EP-A-0,227,586. This solution is not entirely satisfactory either from the accident risk prevention point of view or from the equipment reliability point of view.

From the equipment reliability point of view, it should be emphasized that the extraction sequence according to the state of the technique comprises two stages: the first is unlatching of the opening latch, the second unlatching of the closing latch whereas the opening latch is kept open. This second stage gives rise to an operating sequence, called no-load discharge or discharge on open poles, which differs from the sequences described hitherto. If the circuit breaker is previously in its loaded closed state, the opening order in fact moves it first of all to a loaded open state, which differs from that of FIG. 2 by the fact that the opening latch is kept in the unlatched position. The pole closing order, i.e. the closing latch unlatching order, then releases the roller 33 causing impulse rotation of the drive lever 31 and of its finger 39. Due to the absence of latching of the opening catch 25, the hook 22 is free in rotation and is moved directly to the position of FIG. 1. The excess kinetic energy is absorbed by the end of travel stops of the hook, whereas in a normal cycle, this stop only absorbs a small amount of energy. This no-load discharge therefore implies either that the switchgear unit be over-dimensioned or that its endurance be sacrificed.

In state of the technique equipment in the extracted position, the opening and closing latches are kept open. It is however always possible to operate the resetting lever which acts on the reloading cam. At the end of loading travel, when the roller 47 of the cam 46 comes into contact with the closing ratchet 36, no blocking of the cam occurs due to the fact that the ratchet is not blocked in rotation. Rotation of the cam is therefore pursued and a no-load discharge is obtained.

SUMMARY OF THE INVENTION

One of the objects of the present invention is therefore to limit the no-load discharge cycles or to avoid them completely, by means of a simple and economical device.

According to a first feature of the invention, this problem is solved with a plug-in switchgear apparatus comprising a fixed frame and a circuit breaker movable in the fixed frame between a plugged-out position and a plugged-in position. The circuit breaker comprising at least one pair of contacts, at least one of which is movable and can take with respect to the other contact a closed position also referred to as an intermediate closing position, and an open position, a loading and closing mechanism comprising a spring, called the closing spring, designed to move from a loaded state to a released state; a latch, called the closing latch, designed to latch the closing spring in its loaded state, the closing spring being associated to the movable contact in such a way that relaxation of the closing spring drives the movable contact to its closed position. A drive mechanism comprising a driving part, a switchgear apparatus whose drive mechanism comprises a trip mechanism which is designed to move from a closed, or coupling state wherein actuation of the drive part is designed to move the closing spring to its loaded state, to a tripped state wherein actuation of the drive part is designed not to move the closing spring to its loaded state. When the trip mechanism is in its tripped, or uncoupling state the closing spring can no longer be loaded. The risk of no-load discharge by operation of the drive part of the drive mechanism is consequently eliminated, both on extraction of the circuit breaker and when the circuit breaker has been extracted. In addition to preserving the equipment, this trip mechanism moreover provides a decisive advantage for safety of persons. State of the art equipment in the extracted position, with the opening and closing latches open, is not in fact hazard-free. It is in particular possible to operate the drive part of the circuit breaker loading device, i.e. the oscillating loading lever, so as to partially load the closing spring, before the dead point of the loading cam 46 is reached. The state of the partially reloaded loading mechanism is stable, since the free-wheel coupling opposes the force exerted by the spring. The operator in charge of performing maintenance of the switchgear unit can therefore, without being aware of it, find himself confronted with a circuit breaker whose closing spring is partially loaded. Opening of the switchgear unit in this state is potentially dangerous, as is handing thereof, all the more so as the slightest action on the reloading lever can result in the dead point being passed and lead to high-speed discharge of the closing spring. From this point of view, the trip mechanism, in its tripped position, prevents any action on the loading cam and any reloading, even partial, of the closing spring.

The trip mechanism can be set to its tripped state by a manual control. However, it is preferable to equip the switchgear apparatus with a control means of the trip mechanism able to detect the fact that the circuit breaker passes via an intermediate position called the tripped, or intermediate uncoupling position between the plugged-out position and the extracted position, in the extraction direction, and in this case to move the trip mechanism to its tripped state, as well as with a control means of the closing latch able to detect the fact that the circuit breaker passes via an intermediate position called the closed position between the plugged-out position and the extracted position, in the extraction direction, and in this case to drive the closing latch to its unlatched position, the intermediate tripped position being situated between the plugged-out position and the intermediate closed position, or being appreciably the same as the latter position. The sequencing obtained enables any involuntary reloading operation of the closing spring to be prevented after the closing latch has been unlatched.

In preferred manner, the intermediate closed position and the intermediate tripped position are appreciably identical and, furthermore, the closing latch control means and the trip mechanism control means have in common a movable element supported by the circuit breaker between a passive position and a tripping command position, and at least one cam supported by the fixed frame, the movable element operating in conjunction with a tripping command surface of the cam so as to move from its passive position to its tripping command position when the circuit breaker passes via the common intermediate closed and tripped position, in the extraction direction. This arrangement enables a particularly economical device to be achieved which is moreover simple to assemble.

In preferred manner, the switchgear apparatus in addition comprises on the one hand an opening mechanism comprising a spring called the opening spring able to move from a loaded state to a released state and from the released state to the loaded state, and a latch called the opening latch designed to latch the opening spring in its loaded state, the opening spring being associated to the movable contact in such a way that relaxation of the opening spring drives the movable contact to an open position and that movement of the movable contact to its closed position results in loading of the opening spring, and on the other hand a control means of the opening latch able to detect the fact that the circuit breaker passes via an intermediate position called the first open position between the plugged-out position and the tripped position, in the extraction direction, and in this case to drive the opening latch to its unlatched position, the opening latch control means and the trip mechanism control means having in common a movable element supported by the circuit breaker between a passive position and a tripping command position, passing via a first opening control position situated between the other two positions and at least one cam supported by the fixed frame, the movable element operating in conjunction with a first opening command surface of the cam in such a way as to move from its passive position to its first opening control position when the circuit breaker passes via the intermediate open position, in the extraction direction, the movable element operating in conjunction with a tripping, or uncoupling command surface of the cam so as to move from its first open position to its tripping, or uncoupling command position when the circuit breaker passes via the intermediate tripped position, in the extraction direction. This arrangement enables the simplicity to be further increased by limiting the number of parts and making assembly and adjustment setting operations easier. Depending on whether the opening latch is able to revert to its closed position or not after passing via the first open position, the closing order when the circuit breaker passes via the intermediate closed position excludes or does not exclude the possibility of no-load discharge. The movable element may moreover be common to the opening control, the tripping control and the closing control, which enables the number of parts to be limited even further and adjustment settings to be made even easier.

Preferably, the drive part is rotary, the drive mechanism comprises at least one free-wheel clutch designed to transmit the movement of the drive part in one direction of rotation of the latter and not to transmit it in the other direction of rotation, and the trip, or uncoupling mechanism in its tripped, or uncoupling state is designed to neutralize said free-wheel clutch so that rotation of the drive part is not transmitted in either of the two rotation directions. This embodiment enables the drive part, generally formed by an oscillating lever, to be totally disengaged. More precisely, the free-wheel clutch comprises at least one movable part movable between a closed, or engaged position in which it enables transmission of the movement of the drive part and a tripped, or disengaged position in which it does not enable transmission of the movement of the drive part and the trip mechanism comprises a blocking plate for blocking said movable part of the free-wheel clutch in the tripped position.

According to another alternative embodiment, the drive mechanism comprises a rotary driven part and at least one free-wheel coupling designed to prevent rotation of the driven part in one direction, and the trip mechanism in its tripped state is designed to neutralize said free-wheel coupling so that rotation of the driven part is possible in both directions. This alternative embodiment enables the closing spring to be relaxed when the latter is in a partially loaded state between its released state and its loaded state. In this intermediate state, unlatching of the closing latch does not in fact have any effect on the closing spring. Neutralizing the free-wheel coupling enables the cam to rotate in the opposite direction to the loading direction and thus enables relaxation of the closing spring. This alternative embodiment can usefully be combined with the previous embodiment. By disengaging the drive part of the drive mechanism before neutralizing the free-wheel coupling, relaxation of the partially loaded closing spring is in fact enabled, while preventing its energy from being transmitted to the drive part.

According to another feature of the invention, the problem is solved with an electrical switchgear apparatus comprising a fixed frame and a circuit breaker movable in the fixed frame between a plugged-out position and a plugged-in position, the circuit breaker comprising at least one pair of contacts at least one of which is movable and can take with respect to the other contact a closed position and an open position, a loading and closing mechanism comprising a spring called the closing spring designed to move from a loaded state to a released state, a latch called the closing latch designed to latch the closing spring in its loaded state, the closing spring being associated to the movable contact in such a way that relaxation of the closing spring drives the movable contact to its closed position, an opening mechanism comprising a spring called the opening spring designed to move from a loaded state to a released state and from the released state to the loaded state, and a latch called the opening latch designed to latch the opening spring in its loaded state, the opening spring being associated to the movable contact in such a way that relaxation of the opening spring drives the movable contact to an open position and that movement of the movable contact to its closed position results in loading of the opening spring, said switchgear apparatus comprising a control means of the opening latch able to detect the fact that the circuit breaker passes via an intermediate position called the first open, or first intermediate opening position between the plugged-out position and the extracted position, in the extraction direction, and in this case to drive the opening latch to its unlatched position, and a control means of the closing latch able to detect the fact that the circuit breaker passes via an intermediate position called the closed position between the first open position and the extracted position, in the extraction direction, and in this case to drive the closing latch to its unlatched position, a switchgear apparatus whose opening latch is designed to revert to its latching position before the circuit breaker passes via its intermediate closed position, in the extraction direction, said opening latch control means being moreover designed to detect the fact that the circuit breaker passes via an intermediate position called the second open, an intermediate position between the closed position and the extracted position, in the extraction direction, and in this case to drive the opening latch to its unlatched position. By modifying the sequencing of the closing and opening commands on extraction in this way, the no-load discharge cycle of the state of the technique is prevented, since it is replaced by a full OCO cycle. The fact that the OCO discharge cycle is controlled by the positioning of the circuit breaker in the switchgear apparatus frame makes implementation of the device very flexible. In particular, if for certain uses the OCO discharge cycle is not desired, it is possible by very simple modifications of the control means to choose another discharge sequence. Preferably, the opening latch control means is able to detect the fact that the circuit breaker passes via the intermediate second open position in the plug-in direction, and in this case to drive the opening latch to its unlatched position, the opening latch being designed to revert to its latched position before the circuit breaker passes via its intermediate closed position, in the plug-in direction, the closing latch control means being able to detect the fact that the circuit breaker passes via the intermediate position called the closed position in the plug-in direction, and in this case to drive the closing latch to its unlatched position, and the opening latch control means being able to detect the fact that the circuit breaker passes via the intermediate first open position in the plug-in direction and in this case to drive the opening latch to its unlatched position. This enables no-load discharges to be prevented also when plug-in is performed.

Preferably, this OCO sequence when extraction is performed is combined with a trip mechanism of the previously described type. This combination enables no-load discharges to be prevented both during extraction and on the extracted circuit breaker.

In practice, the control means of the opening and closing latches and of the trip mechanism comprise one or more cams or contact surfaces securedly affixed to the frame of the switchgear apparatus, operating in conjunction with movable follower elements, for example levers or slides, transmitting the information directly or via a connecting rod system to the mechanisms concerned, i.e. the opening latch, the closing latch and the trip mechanism. It is therefore possible, by modifying the contact surfaces of the cams or by limiting the travel of the movable follower elements by end of travel stops, to defer the choice between operation according to the invention and conventional operation till the stage when the apparatus is put into operation.

BRIEF DESCRIPTION OF THE DRAWINGS

Other advantages and features of the invention will become more clearly apparent from the following description of different embodiments of the invention, given as non-restrictive examples only and represented in the accompanying drawings in which:

FIG. 20 is a perspective view of the third embodiment of the invention, showing more particularly a trip mechanism;

FIG. 21 is a detailed view of a single control latch of a fourth embodiment of the invention.

DETAILED DESCRIPTION OF THE PREFERRED EMBODIMENT

Figure 6:
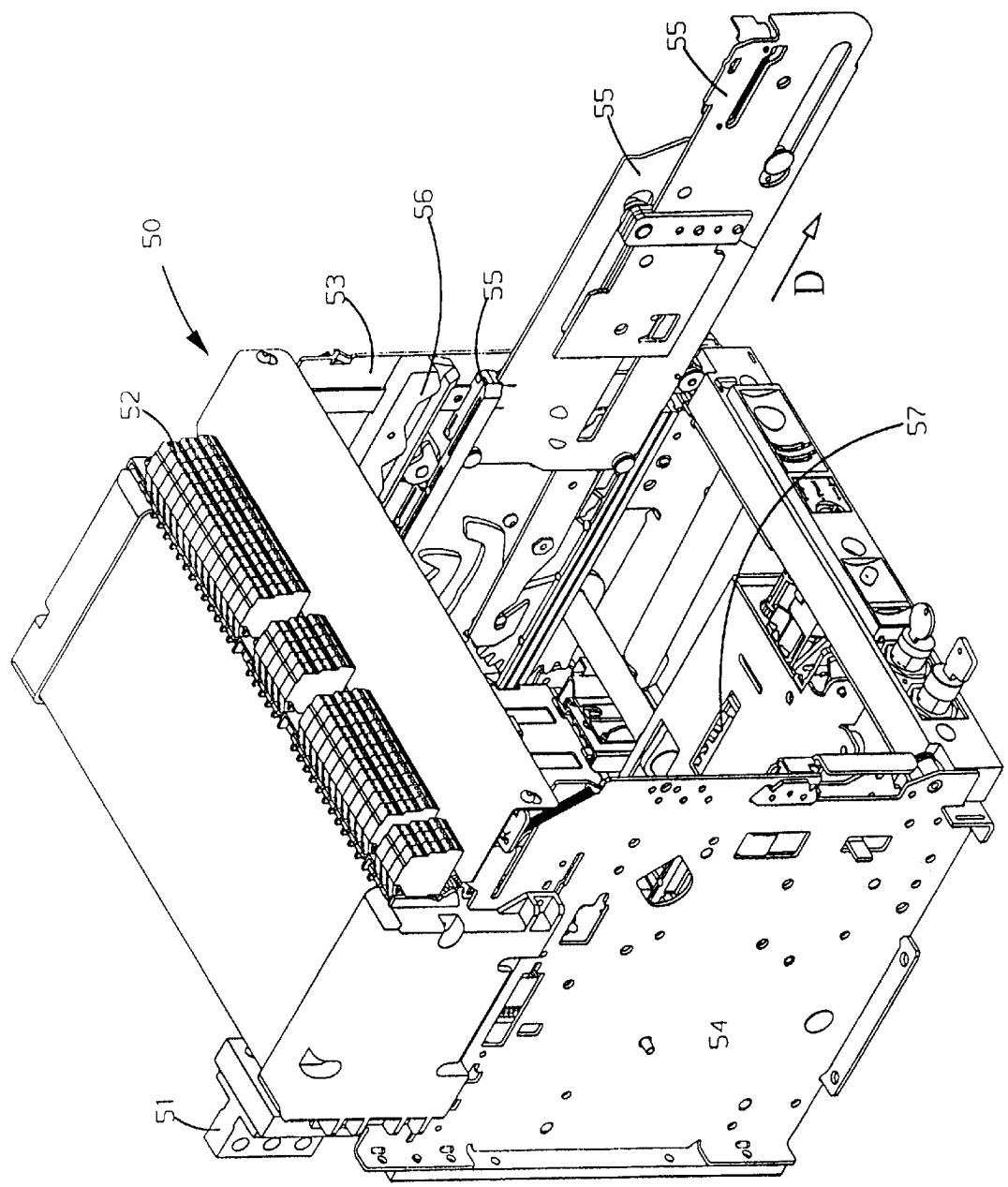
FIG. 6 represents in perspective a frame for a plug-in circuit breaker according to a first embodiment of the invention.

The fixed external frame 50 of a plug-in circuit breaker has been represented in FIG. 6. This frame comprises on its rear face terminal strips 51 for electrical connection to a busbar of the electrical power distribution system. On the side walls 53 and 54 of the frame there are arranged slides 55 designed to support and guide the circuit breaker in its translation movement between its extracted position and its plugged-in position. The wall 53 has affixed thereon a cam 56. The frame also comprises in its lower part a draw-in mechanism comprising a longitudinal primary shaft 57 whose free end is designed to operate in conjunction with an operating crank and a transverse countergear shaft 58 linked to the primary shaft 57 by a countergear transmission (not represented), the transverse shaft 58 bearing two sectors of cog-wheels 59 each engaging with a draw-in cam. Rotation of the primary shaft 57 brings about rotation of the cams in conventional manner which both drive a roller of the circuit breaker in reversible manner between the plugged-out position and the plugged-in position.

Figure 7:
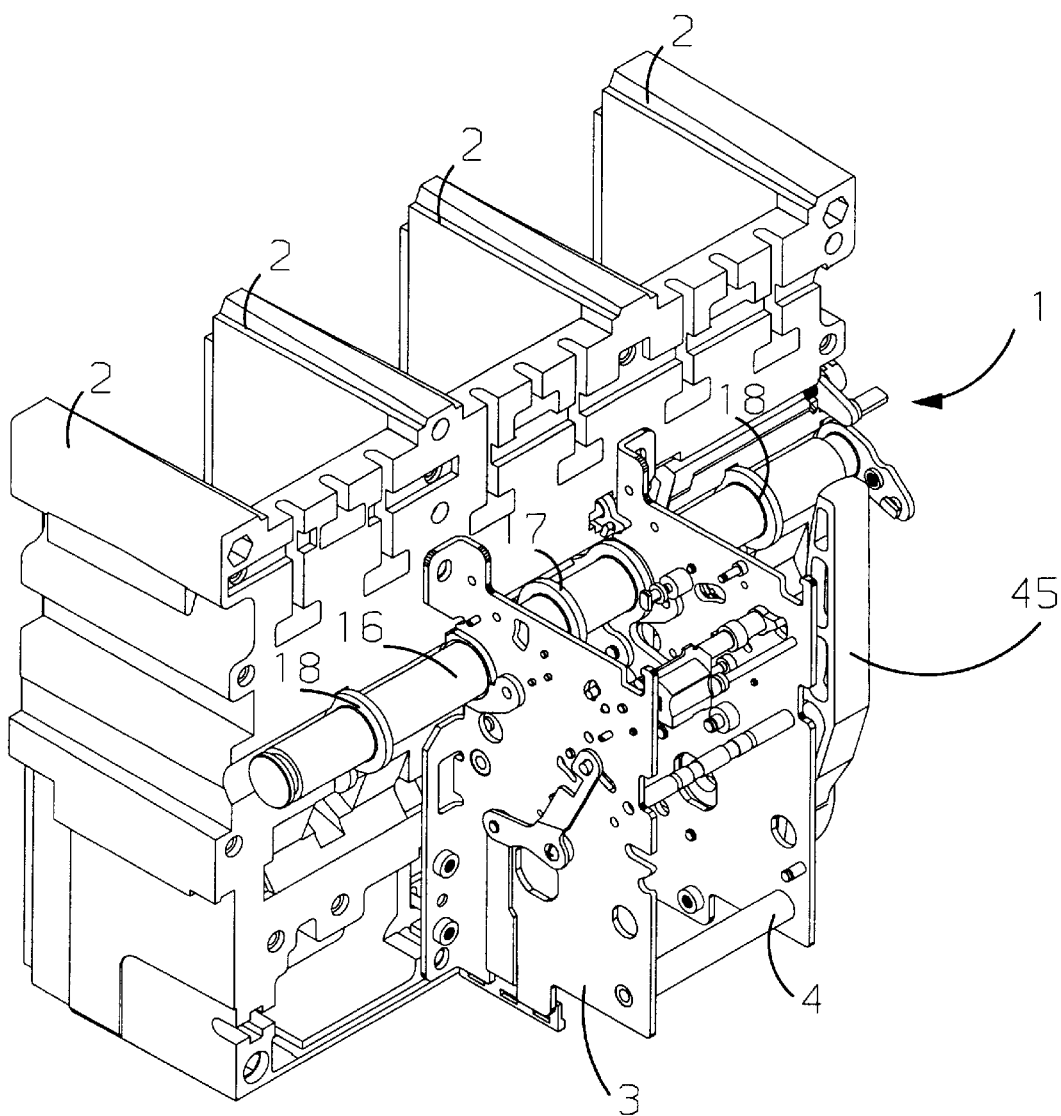
FIG. 7 represents in perspective the plug-in circuit breaker according to the first embodiment of the invention, withdrawn from its frame, and shows in particular a left side flange.

FIG. 7 represents the circuit breaker 1 withdrawn from its external frame 50. The circuit breaker pole partitioning walls 2 can be seen at the rear part. The poles are similar in their construction to the state of the technique of FIGS. 1 to 5. The front part comprises a left flange 3 and a right flange 4 acting as supports for the various elements of the opening mechanism 20 and of the loading and closing mechanism 30.

Figure 1:
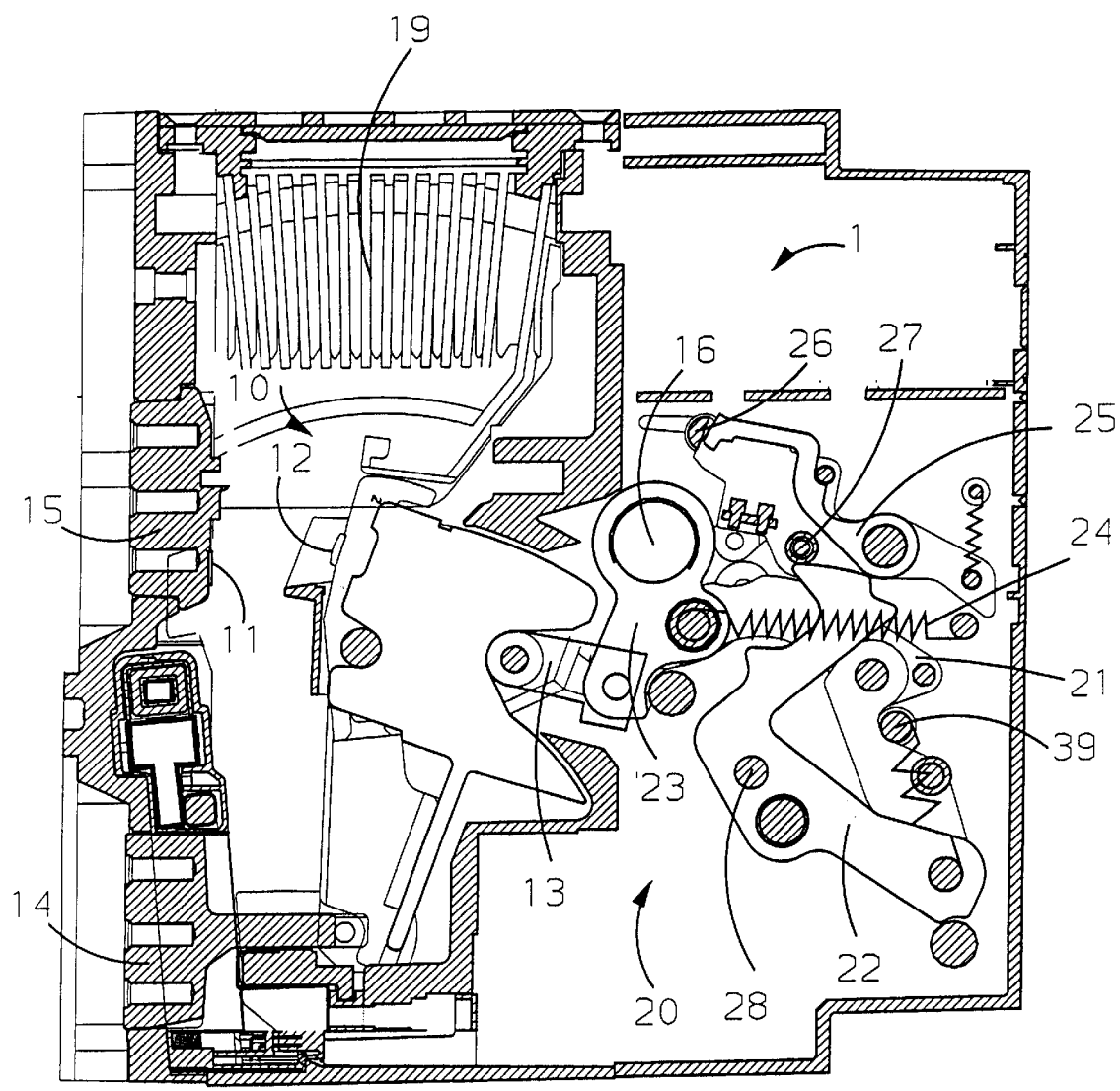
FIG. 1, which has already been commented, represents an open pole and its opening mechanism in the open and unloaded position, in an embodiment common to the state of the technique and to the set of embodiments of the invention.
Figure 2:
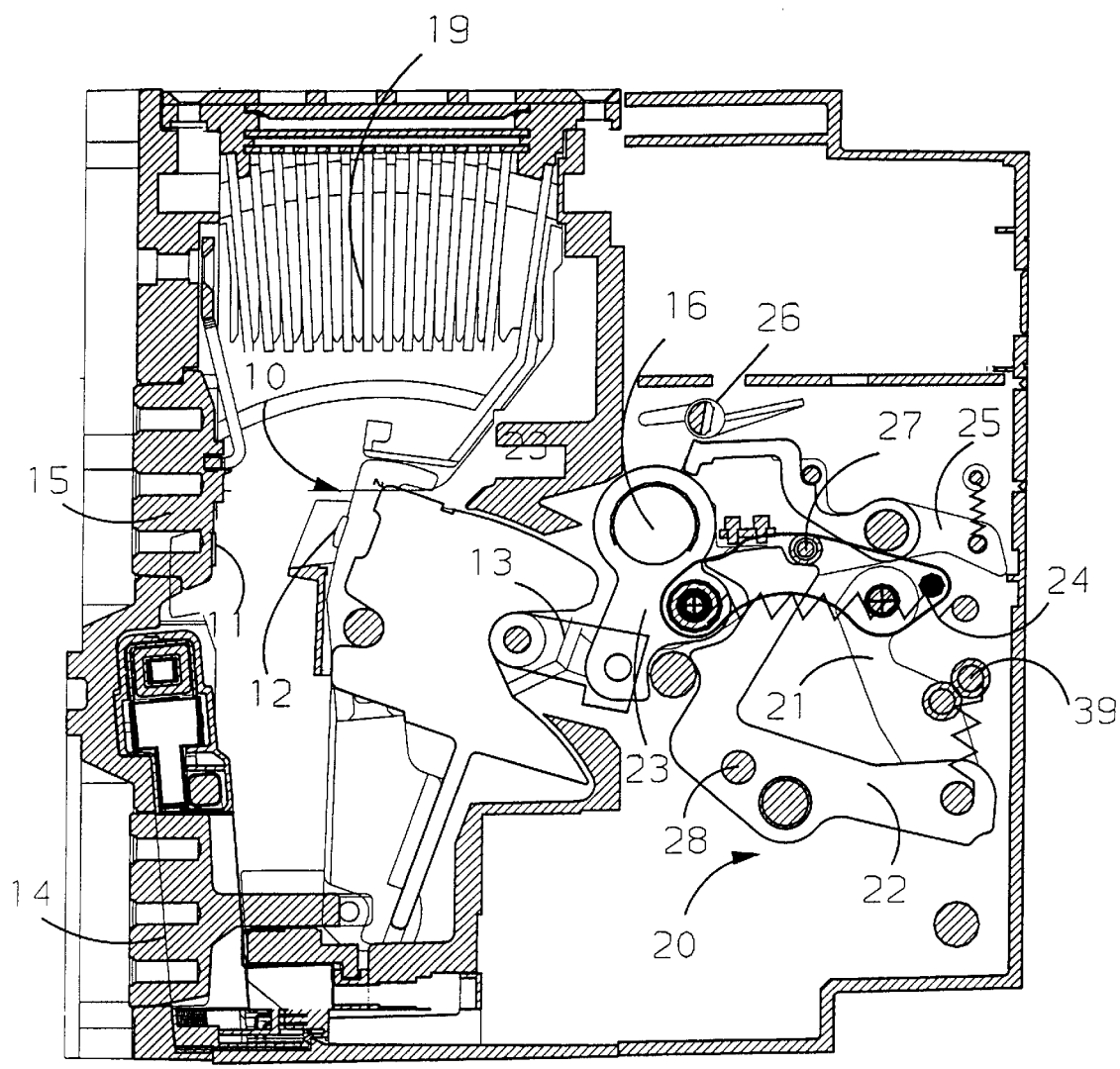
FIG. 2 represents the pole of FIG. 1 in the open position and its opening mechanism in the loaded open position.
Figure 3:
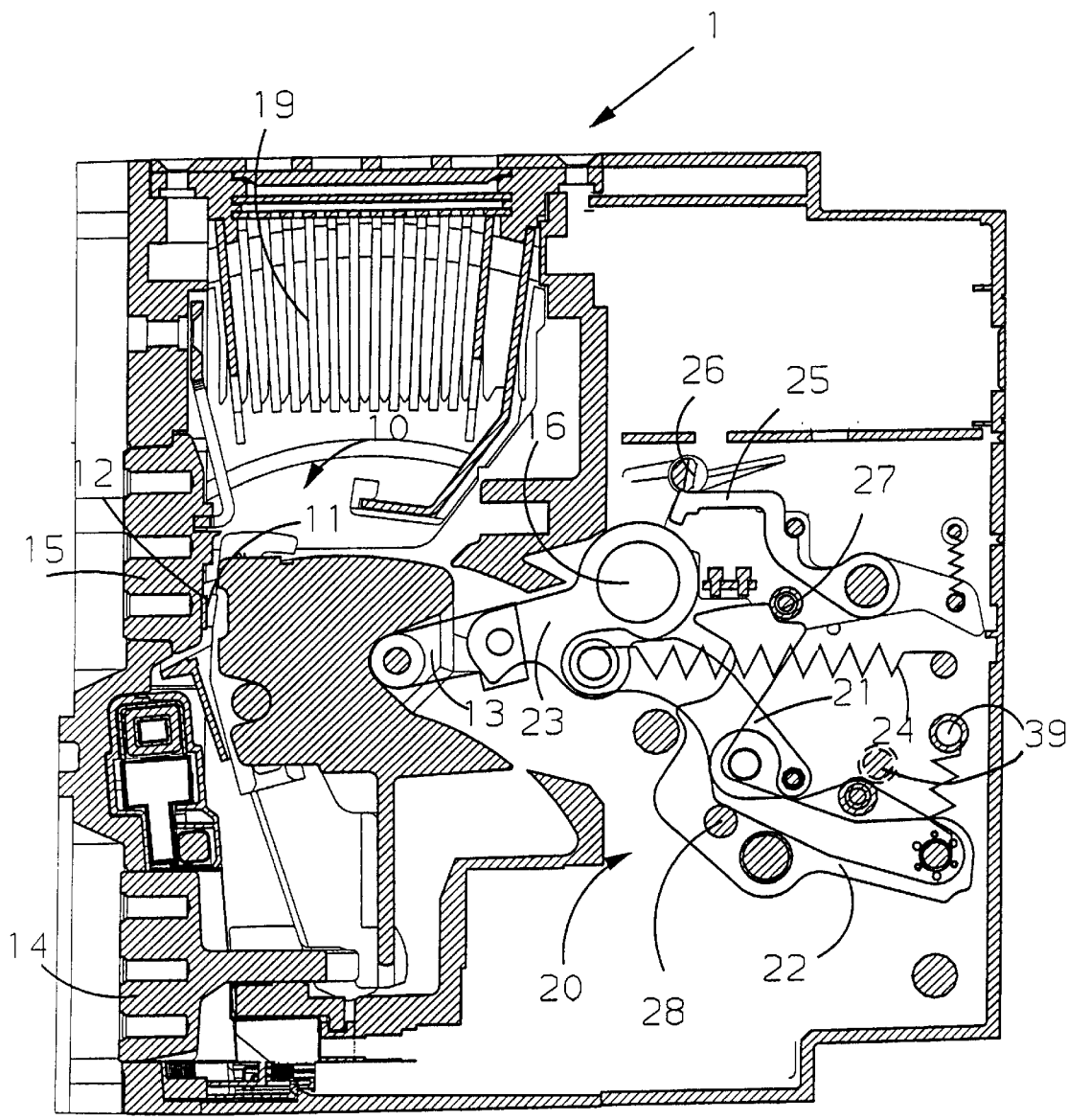
FIG. 3 represents the pole of FIG. 1 in the closed position and its opening mechanism in the closed position.
Figure 4:
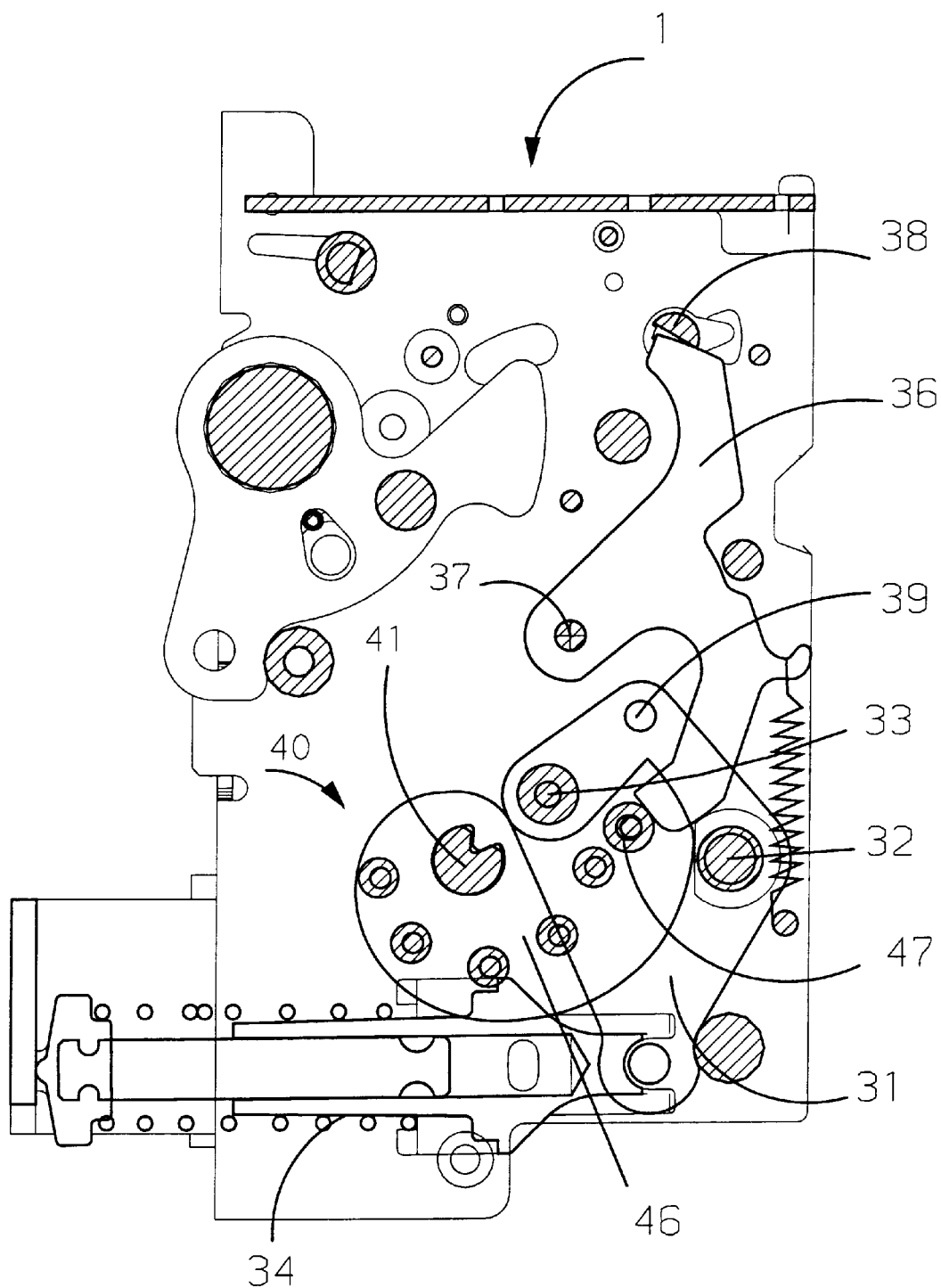
FIG. 4, which has already been commented, represents a loading and closing mechanism in the unloaded position in an embodiment common to the state of the technique and to the invention.
Figure 5:
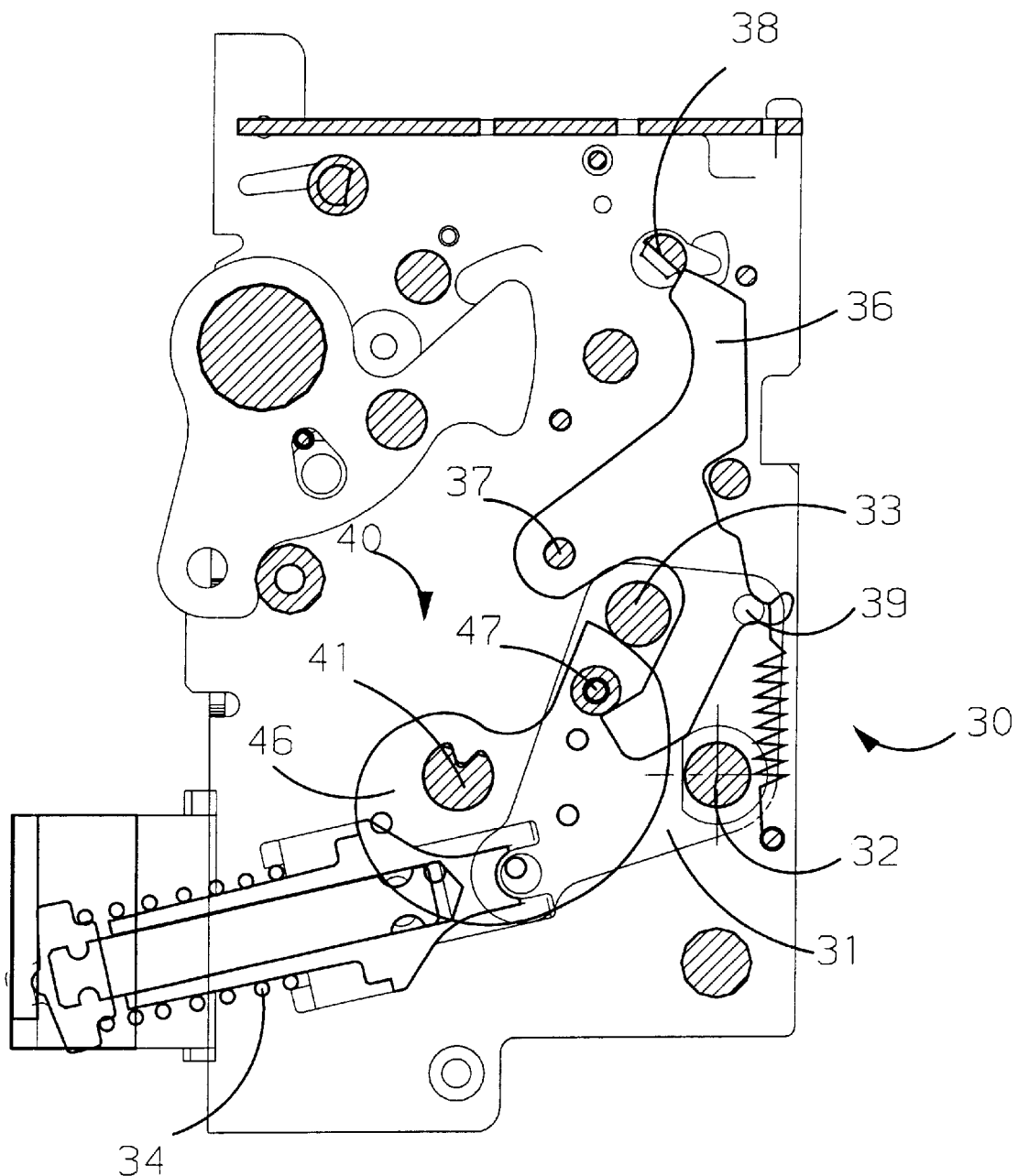
FIG. 5 represents the loading and closing mechanism of FIG. 4, in the loaded position.

FIG. 7 also shows an oscillating operating lever 45 constituting the driving part of a drive mechanism 40 of the loading cam 47, the driven part being the shaft 41 (FIG. 4). The lever 45 oscillates around its geometric pivoting axis which is identical to the shaft 41, between the raised position represented in FIG. 7 and a lowered position located 90° from the former. The pole shaft 16 on which the crank 17 is fixed, which is articulated on the one hand with one end of the toggle mechanism 21 and on the other hand with the rod 13 of one of the circuit breaker poles, can in addition be seen in FIG. 7. For the other poles, the rods 13 are articulated on levers 18 fixed to the pole shaft 16.

Figure 8:
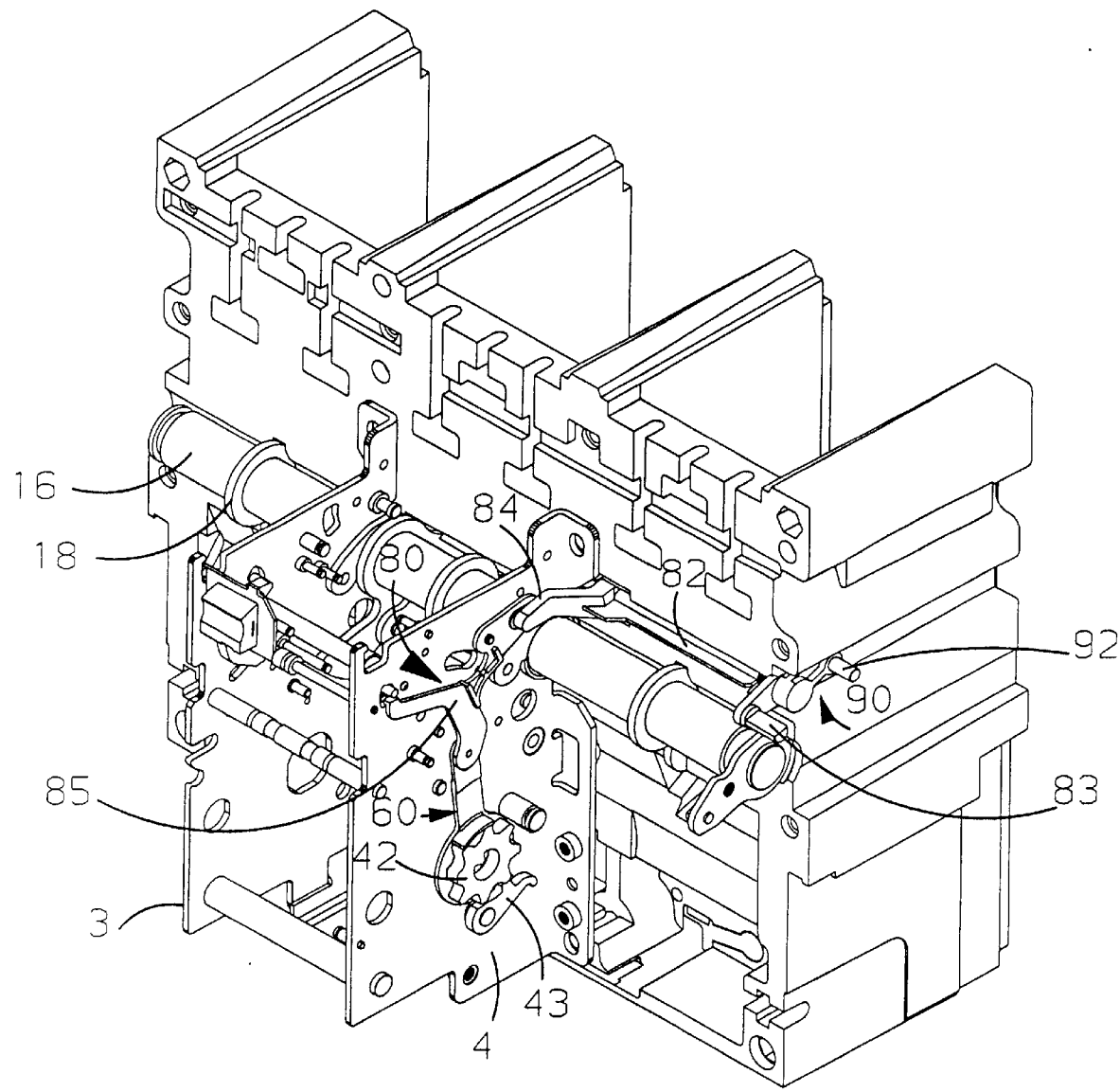
FIG. 8 represents, in another perspective, the circuit breaker according to the first embodiment of the invention, withdrawn from its frame, showing in particular a right side flange supporting a coupling part.
Figure 9:
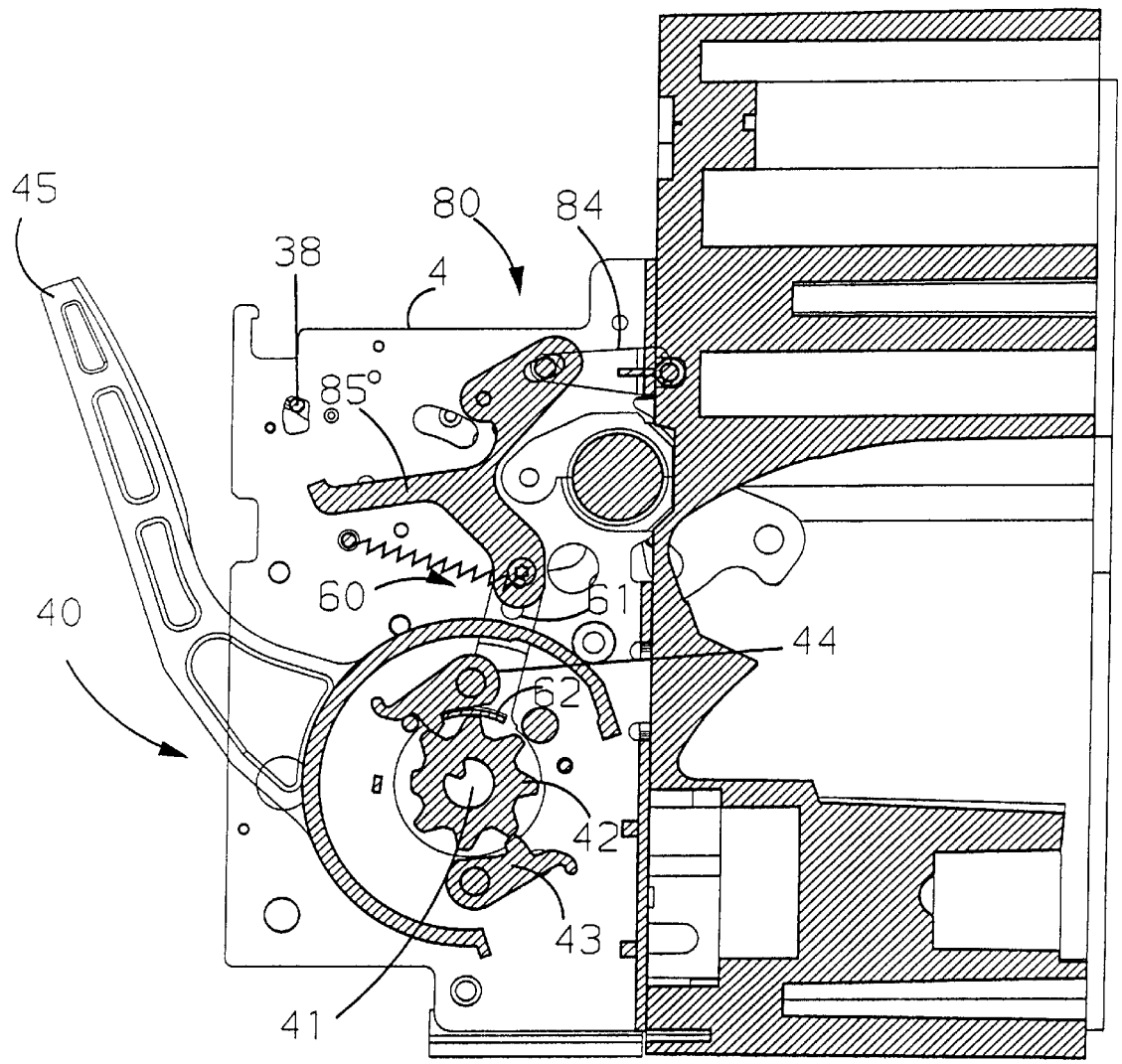
FIG. 9 is a sectional view in a plane parallel to the right side flange of the movable part of the circuit breaker according to the first embodiment of the invention, showing the control part of the coupling part in an inactive state.
Figure 10:
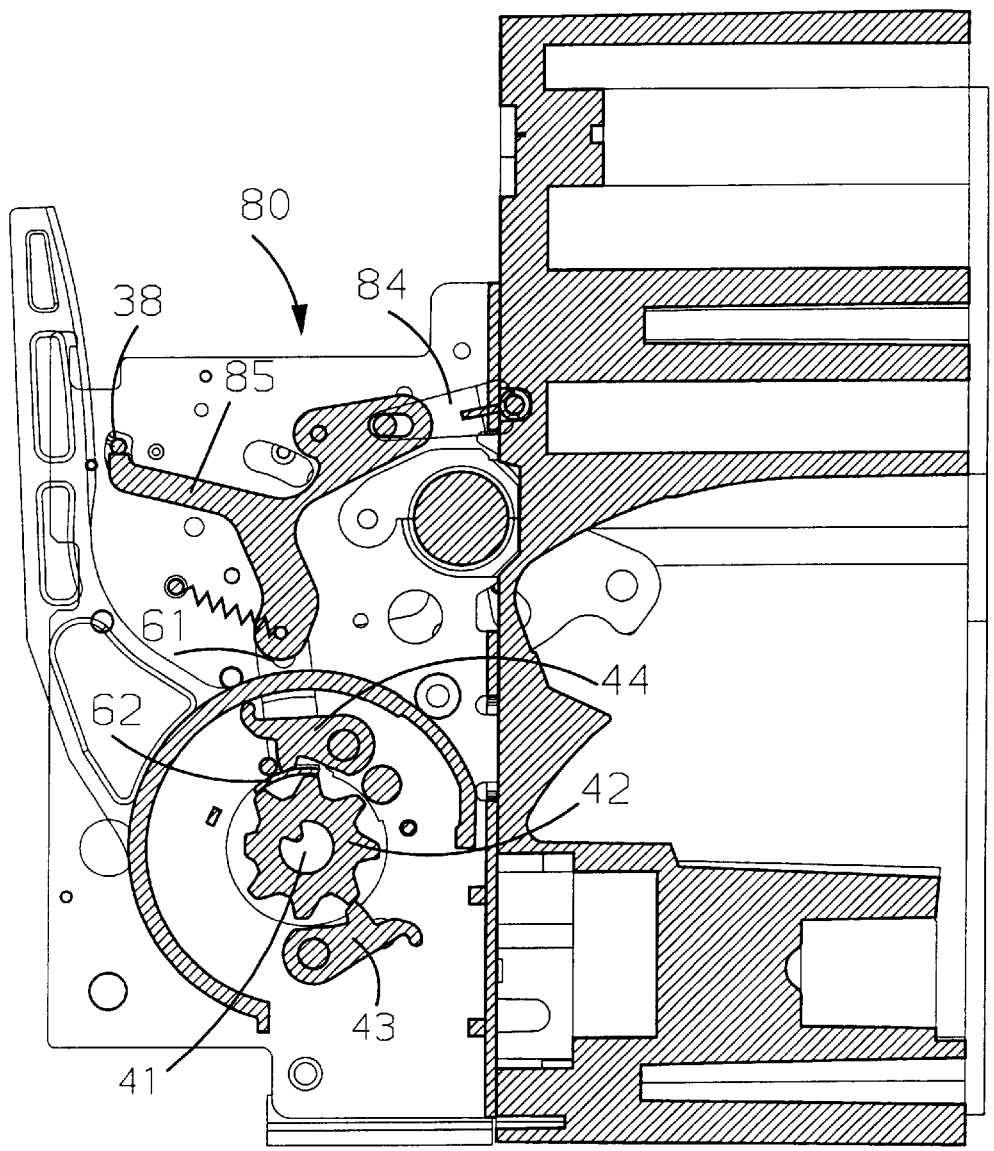
FIG. 10 is a sectional view in a plane parallel to the right side flange of the movable part of the circuit breaker according to the first embodiment of the invention, showing the control part of the coupling part in an active state.

The intermediate elements of the drive mechanism 40 of the shaft 41 and of the loading cam 47 can be seen in FIGS. 8 to 10. In FIG. 8, the oscillating lever 45 has been removed to show a rack wheel 42 keyed onto the shaft 41. The rack wheel 42 operates in conjunction with an anti-return catch 43 whose spindle is supported by the flange 4. This catch 43 prevents rotation of the rack wheel in the clockwise direction in FIG. 8. The rack wheel 42 and catch 43 therefore form together a free-wheel coupling between the shaft 41 or loading cam 47 and the support flange 4 secured to the circuit breaker 1. The oscillating lever 45 is secured to a dish whose cylindrical edges can be seen in cross section in FIG. 9 and whose base, which is not visible, extends in the plane of FIG. 9 and supports the spindle of a drive ratchet 4. The ratchet 44 operates in conjunction with the rack wheel 42 in such a way as to oppose rotary movement of the rack wheel 42 with respect to the ratchet 44 and oscillating lever 45 in the clockwise direction. The rack wheel 42 therefore forms with the ratchet 44 a free-wheel clutch between on the one hand the drive part 45 and on the other hand the shaft 41 or cam 47 constituting a driven part.

The circuit breaker also comprises a trip mechanism 60 comprising a ratchet cache lever 61 pivotally mounted with respect to the axis of the shaft 41. This ratchet cache 61 bears a plate 62 extending in a direction appreciably parallel to the axis of the shaft 41. According to the position of the ratchet cache lever 61, this plate 62 is movable between a withdrawn position which can be seen in FIG. 9 and an active position which can be seen in FIG. 10.

Figure 11:
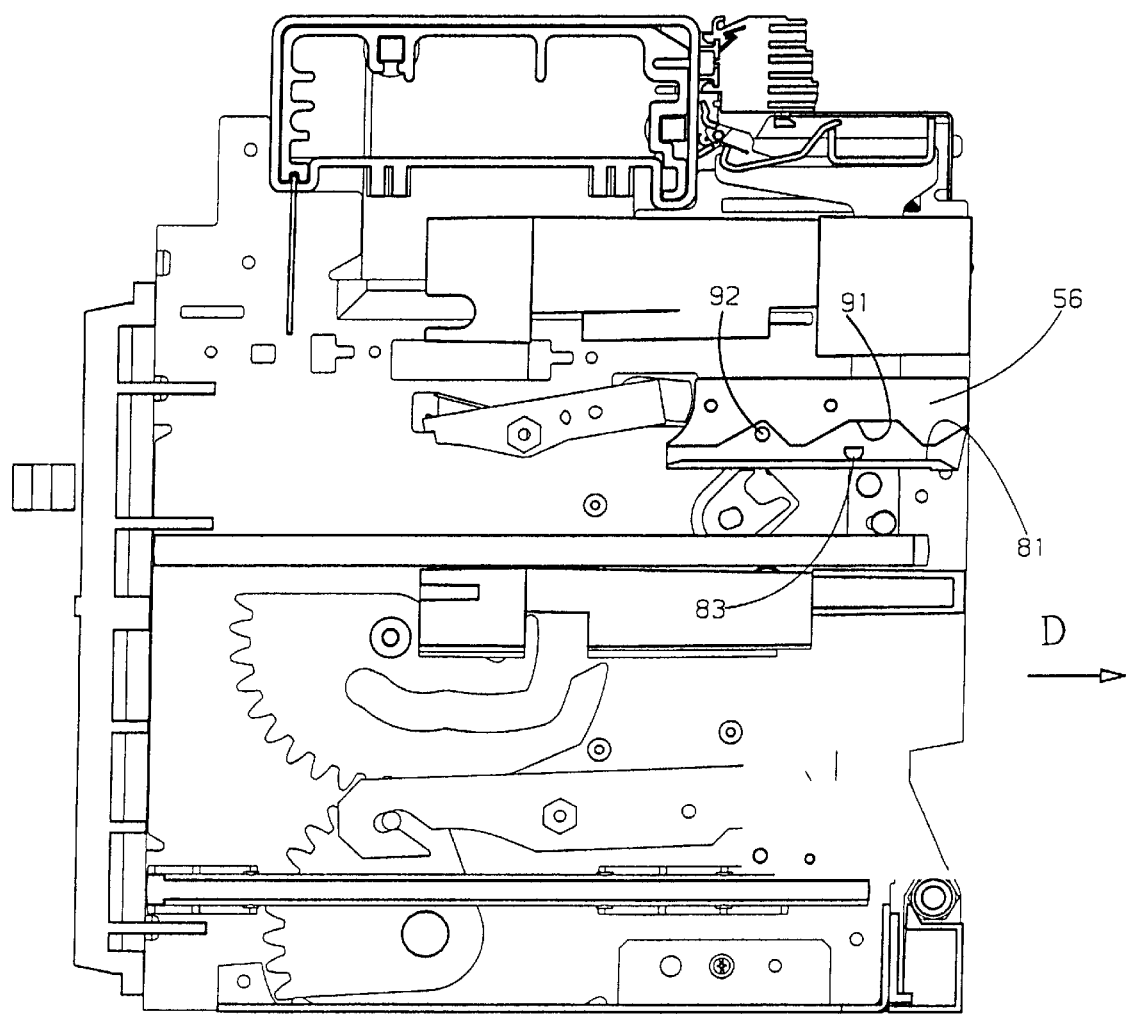
FIGS. 11 to 14 are schematic views showing operation of opening control and closing control levers in conjunction with a cam supported by the circuit breaker frame according to the first embodiment of the invention.

The circuit breaker further comprises a common control 80 of the trip mechanism 60 and of the closing latch 38. A part of the control 80 is supported by the fixed external frame 50 of the circuit breaker and is formed by a first surface 81 of the cam 56 (FIG. 11). Another part of the control 80 is arranged on the circuit breaker and comprises a lever 82 which can be seen in FIG. 8 with a drive arm 83 designed to operate in conjunction with the surface 81 and a driven arm 84 articulated on an intermediate lever 85 by a sliding articulation, the articulation comprising a slide securedly affixed to the arm 84 and sliding in an oblong hole of the intermediate lever 85. This intermediate lever is moreover articulated on the arm of the ratchet cache lever 61 by a sliding articulation. The intermediate lever 85 also comprises an arm designed to operate in conjunction with a finger of the closing latch 38. It is clear that the control 80 does not constitute the sole closing control of the circuit breaker. It is naturally superposed on other closing controls which are not included in the scope of the present invention, among which control by a pushbutton on the circuit breaker front panel.

The circuit breaker also comprises an operating mechanism 90 of the opening latch 26. It will be clearly apparent to the man of the trade that this operating mechanism 90 is superposed on one or more other controls commanding the opening latch which are not included in the scope of the present invention and which serve the purpose among other things of commanding opening of the circuit breaker in the plugged-in position (by pushbutton or by electrical control) or between the plugged-in position and the plugged-out position (by a set of levers and cams). A part of the operating mechanism 90 is arranged on the fixed frame and is formed by a second surface 91 of the cam 56. Another part of the operating mechanism is arranged as a mobile part and comprises a control lever 92 designed to operate in conjunction with the surface 91. This lever is biased by a spring to a rest position. It cooperates directly on the opening latch in such a way that the movement of the latch against the return force of its spring drives the opening latch 26 to its open position and that in the opposite manner the lever 92 in its rest position does not interact with the opening latch 26, whatever the position of the latter.

Operation of the device is as follows:

Between the plugged-in position and the plugged-out position represented in FIG. 11, the first surface 81 keeps the drive arm 83 of the lever 82 in the raised position, the intermediate lever 85 thereby being held in the position of FIG. 9 against the force of its return spring. In this position, the plate 62 of the ratchet cache 61 does not interact with the drive ratchet 44. Likewise, the intermediate lever 85 does not interact with the closing latch 38, whatever the position of the latter. Furthermore, the second surface 91 does not interact with the lever 92, the latter therefore remaining in its rest position in which it does not interact with the opening latch 26, whatever the position of the latter.

Figure 12:
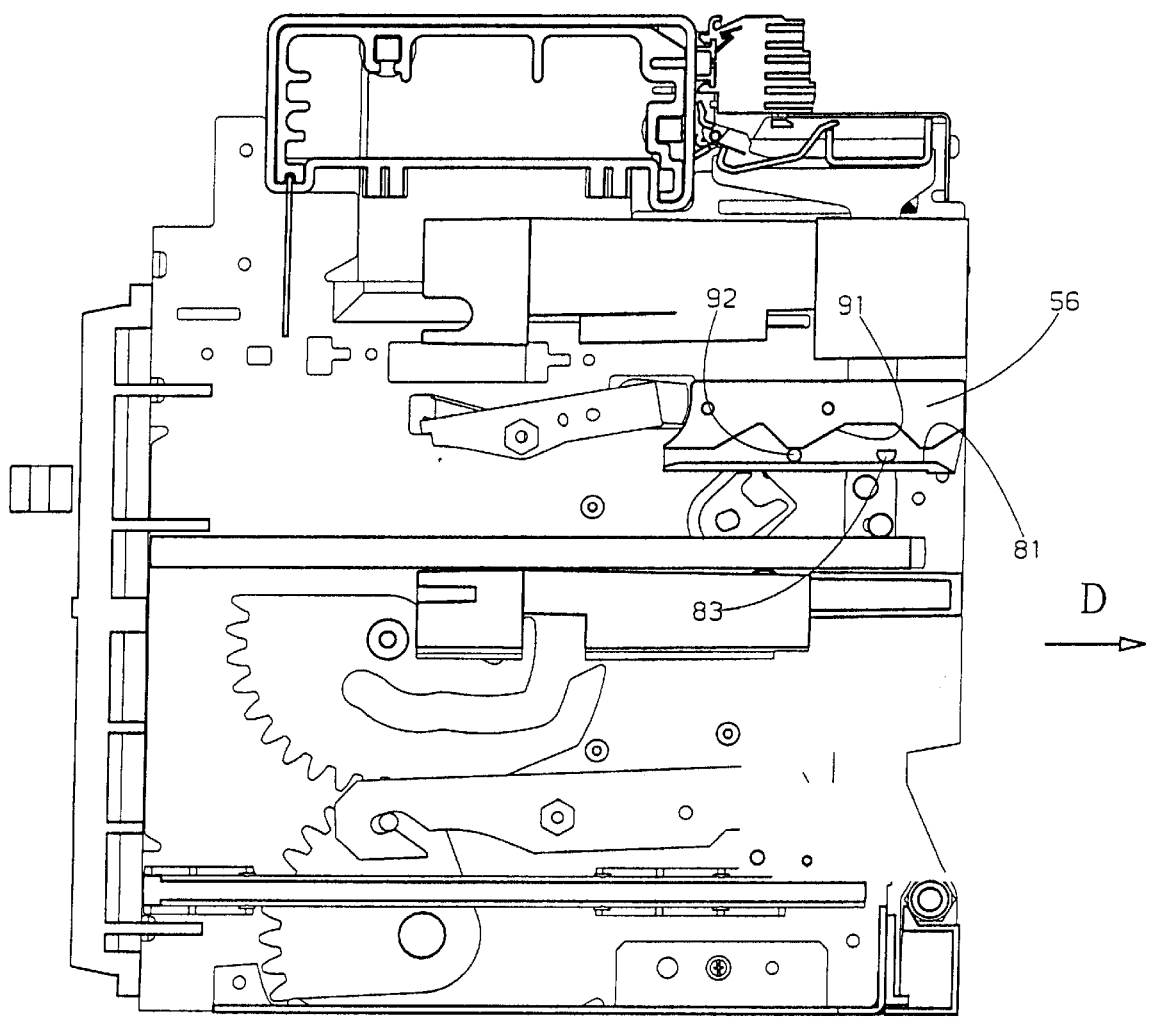
Figure 13:
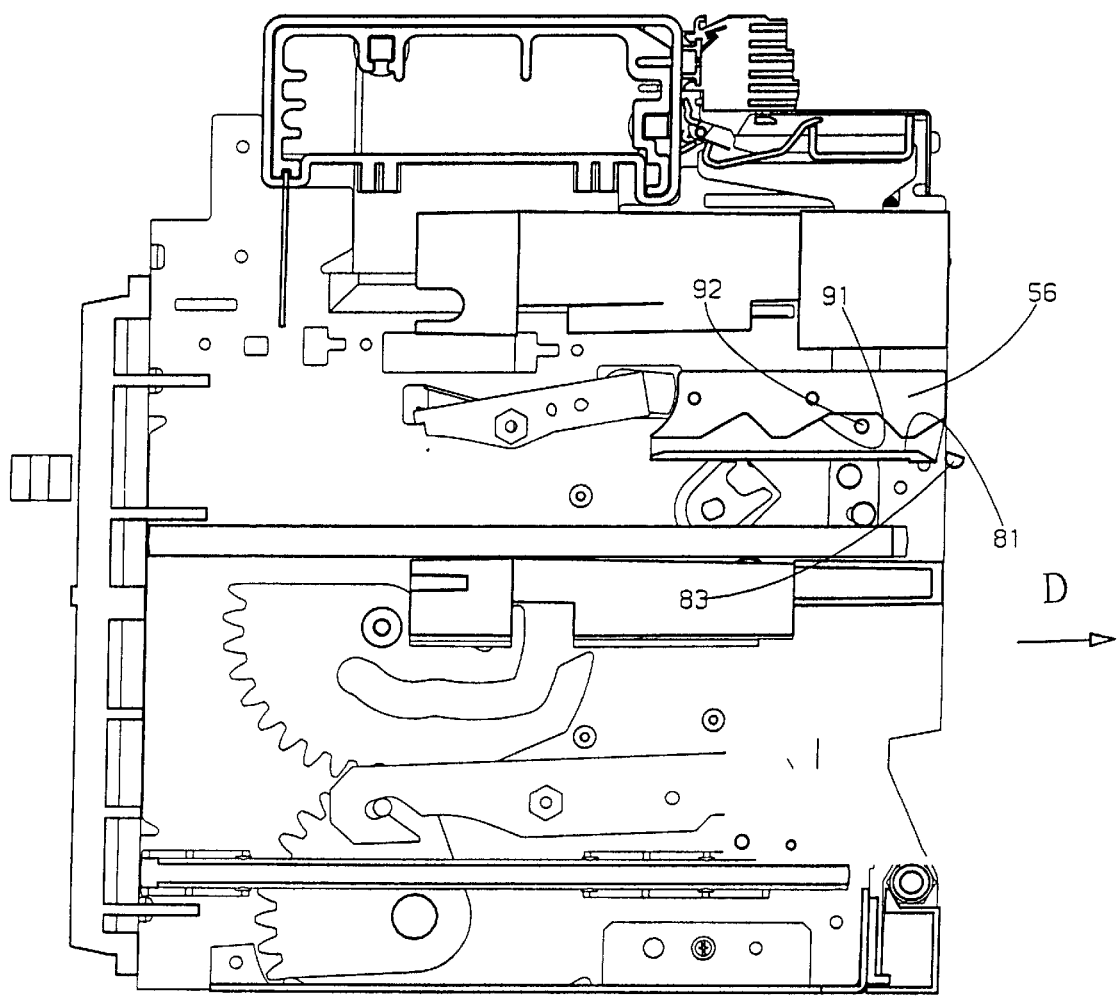
Figure 14:
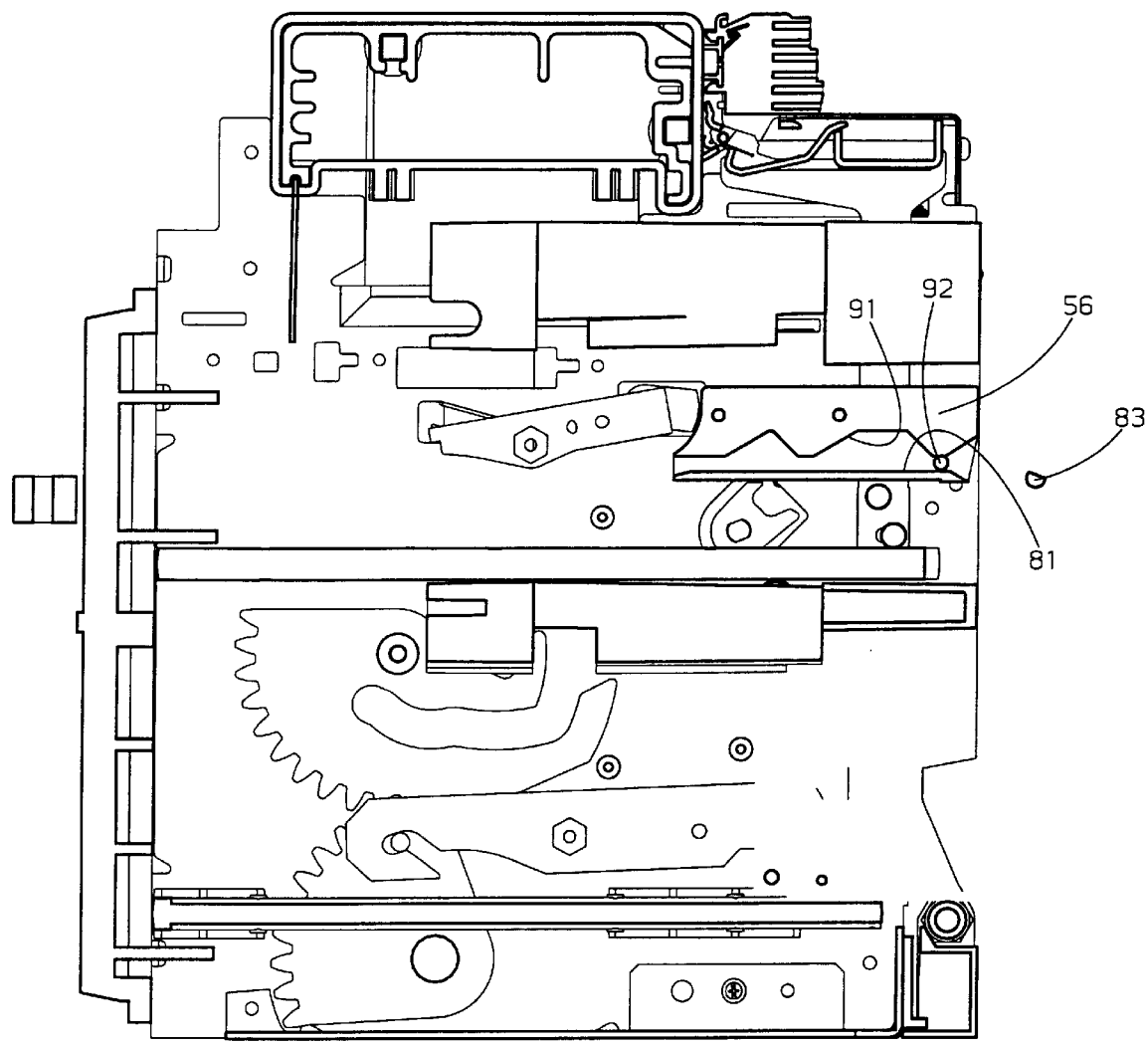

When the circuit breaker is progressively removed from its frame from the plugged-out position to the extracted position in the direction D, the control levers 82 and 92 successively take the positions represented in FIGS. 12 to 14 with respect to the cam 56. In a first phase, schematically illustrated in FIG. 12, the movement of the circuit breaker 1 out of the frame 50 in the direction D causes a cooperation between the opening control lever 92 and a ramp of the second surface 91 of the cam 56, moving the opening control lever 92 to the lowered position and thus bringing about opening of the opening latch 26. At the end of this first phase, the opening mechanism is either in its unloaded open state of FIG. 1 or in its loaded open state of FIG. 2, depending on its initial state. In a second phase, between the positions of FIGS. 12 and 13, the opening control lever 92 is released and due to the bias exerted by its return spring reverts to its rest position releasing the opening latch which is biased to its rest position by its own return spring. The opening latch is then in the latched position. In a third phase, schematically represented in FIG. 13, the control lever 82 of the common control 80 of the trip mechanism 60 and of the closing latch 38 is released by the first surface 81 and, biased by its return spring, moves to its lowered position. The intermediate lever 85 then pivots to the position of FIG. 10. When this pivoting has been completed, the closing latch 38, whatever its previous position, is blocked in its unlatched position, whereas the plate 62 of the ratchet cache 61 has inserted itself between the rack wheel 42 and the drive ratchet 44. Due to the unlatching of the closing latch 38, the loading and closing mechanism 30, if it was previously loaded, is therefore necessarily in its unloaded position at the end of this phase whereas the opening mechanism 20 moves to its closed state: in this case, the poles 10 in fact close and the circuit breaker 1 is in the state of FIGS. 3 and 4. From this moment on, the loading cam 47 can no longer be driven due to the fact that the drive mechanism 40 is neutralized by the trip mechanism 60. The next phase of extraction is schematically represented in FIG. 14: the opening latch control lever 92 is again biased by a ramp of the second surface 91 of the cam 56 and pivots to the lowered position again causing opening of the opening latch 26. At the end of this phase, the switchgear apparatus is therefore necessarily in the unloaded open position, whether it was initially in the open or closed, loaded or unloaded position. Finally, in a last phase of extraction, not represented, the opening control lever 92 is released and, due to the biasing of its return spring, reverts to its rest position releasing the opening latch which also reverts to its rest position due to the biasing of its own return spring.

The extracted circuit breaker is therefore open, and an action on the oscillating lever has no effect on the loading mechanism. The mechanism can no longer be reset, even partially, and therefore no longer constitutes a potential danger for the maintenance operator. However, when the circuit breaker is extracted from its frame, the control levers 82 and 92 are accessible. An operator who is aware of this can therefore purposely fraud the trip mechanism by lowering the control lever 82 manually and blocking it with a tool. A system is thus obtained which prevents dangerous operating errors by an unskilled operator, without penalizing the specialist.

The sequences described above for extraction are reversible when the circuit breaker is pushed from its extracted position to its plugged-out position.

Figure 15:
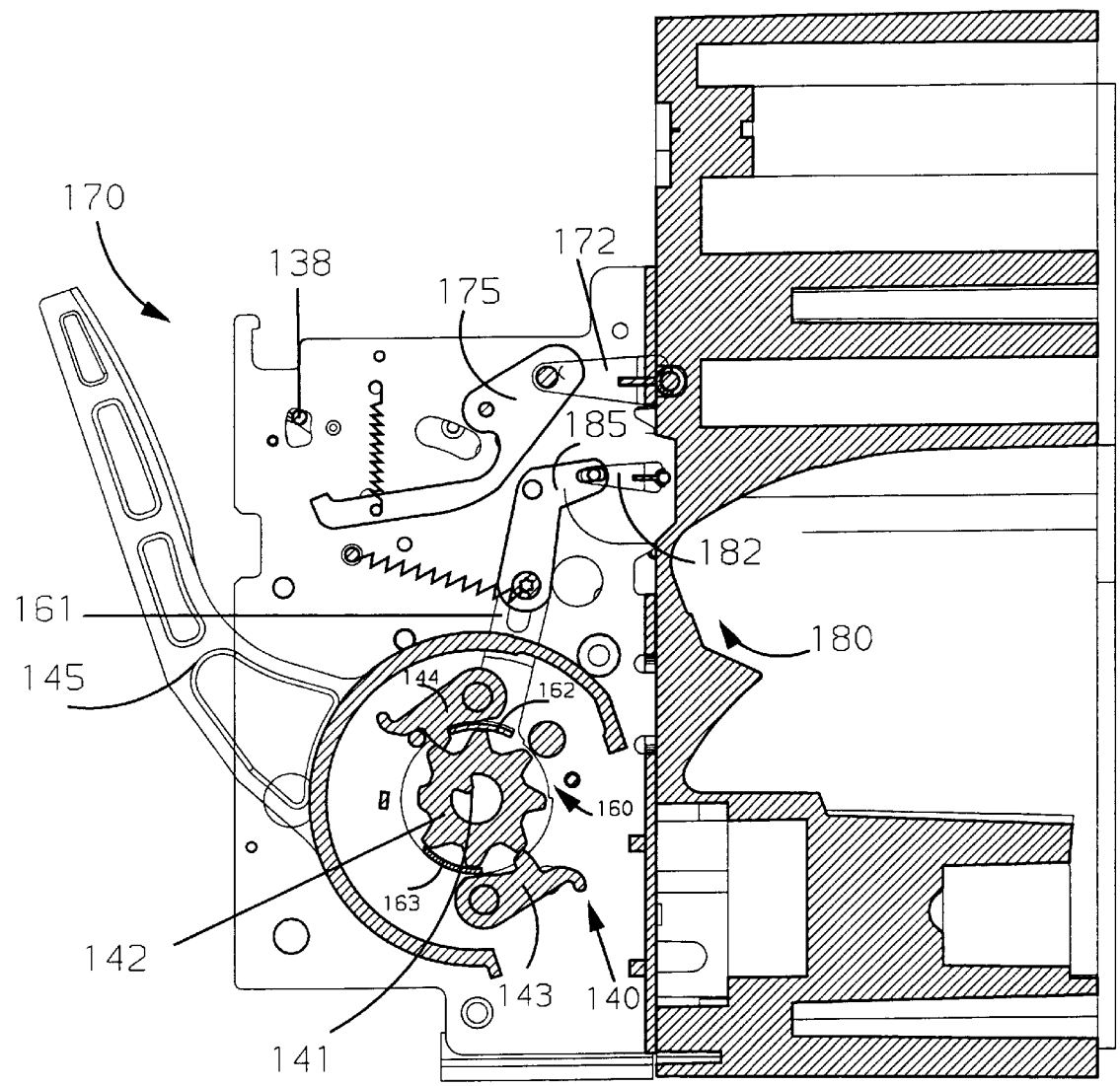
FIG. 15 is a view of a second embodiment of the invention, corresponding to FIG. 8 of the first embodiment.

The first embodiment described comprises a common control for the closing latch and trip mechanism, notably using the intermediate lever 85 with three arms, enabling the closing latch and ratchet cache lever to be driven simultaneously or almost simultaneously. It can however be envisaged to replace this common control by two independent controls, each operated by a control lever and a surface of the cam fixed to the frame. Such a solution is shown schematically in FIG. 15 representing a second embodiment of the invention. A control 170 of the closing latch 138 comprises a control lever 172 operated by a ramp of a cam fixed to the frame of the switchgear apparatus and an intermediate countergear lever 175 biased by a return spring. The arm driving the countergear lever 175 is articulated on the control lever 172 whereas its driven arm is designed to operate in conjunction with a finger of the closing latch 138. Likewise, the control of the trip mechanism 180 comprises a control lever 182 activated by a cam fixed to the frame and by an intermediate countergear lever 185 biased by a return spring.

This solution is interesting in particular if a clear sequencing of the trip control and closing control is to be obtained.

Furthermore, the second embodiment of the invention differs from the first by its trip mechanism 160, which acts both on the drive ratchet 144 and on the anti-return catch 143 of the drive mechanism 140. When the intermediate lever 185 is driven by its return spring in the clockwise direction of FIG. 15, it drives the arm of the ratchet cache 161 which pivots in the counter-clockwise direction. In a first part of its travel, a plate 162 of the ratchet cache clears the drive ratchet 144, then in a second part of its travel, a second plate 163 of the ratchet cache clears the anti-return catch 143. Clearing the drive ratchet 144 has the same function of disengaging the oscillating lever 145 as in the first embodiment. Clearing the anti-return catch 143 also enables the shaft 141 to be released, and therefore relaxes the closing spring 134 if the latter was previously partially loaded. Due to the sequencing of the actions of the two ratchet cache plates, the relaxation of the closing spring is not transmitted to the oscillating lever 145, which eliminates any risk of accident. The cam acting on the control lever 182 of the trip mechanism 160 comprises a first ramp enabling the ratchet cache 161 to perform the first part of its travel and a second ramp enabling the ratchet cache to perform the second part of its travel. The cams of the switchgear apparatus frame act on the control levers of the closing latch and of the trip mechanism in such a way that unlatching of the closing latch takes place between clearing of the drive ratchet and clearing of the anti-return catch.

Naturally, it is also possible to command a trip mechanism of the type described with respect to the second embodiment by a common control of the type described with respect to the first embodiment, in particular by using an intermediate lever with three arms.

It can moreover be envisaged to use a single ratchet cache plate only, interposed between the anti-return catch and the rack wheel. In this case, an oscillation of the oscillating lever does in fact drive the loading cam, but the cam returns to its unloaded position when the lever moves to its raised position, which results in the closing spring never reaching its loaded state.

A third embodiment of the invention can be seen in FIGS. 16 to 20. This embodiment differs from the previous one essentially by the fact that a single control lever 292 is used for a common control 290 of the opening latch 226, the trip mechanism 260 and the closing latch 238.

Figure 16:
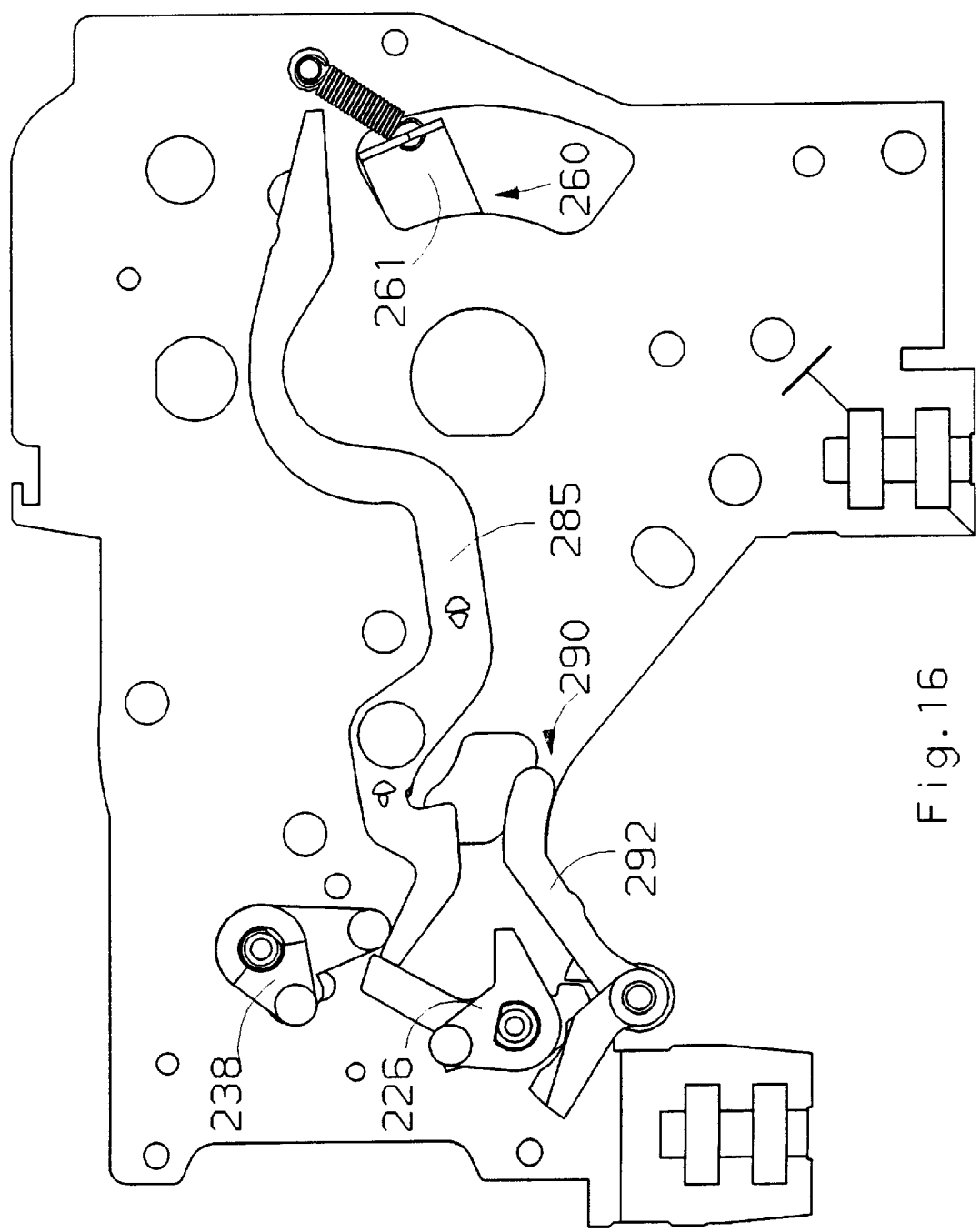
FIG. 16 is a schematic view of a third embodiment of the invention, with a single control lever in the inoperative position.
Figure 17:
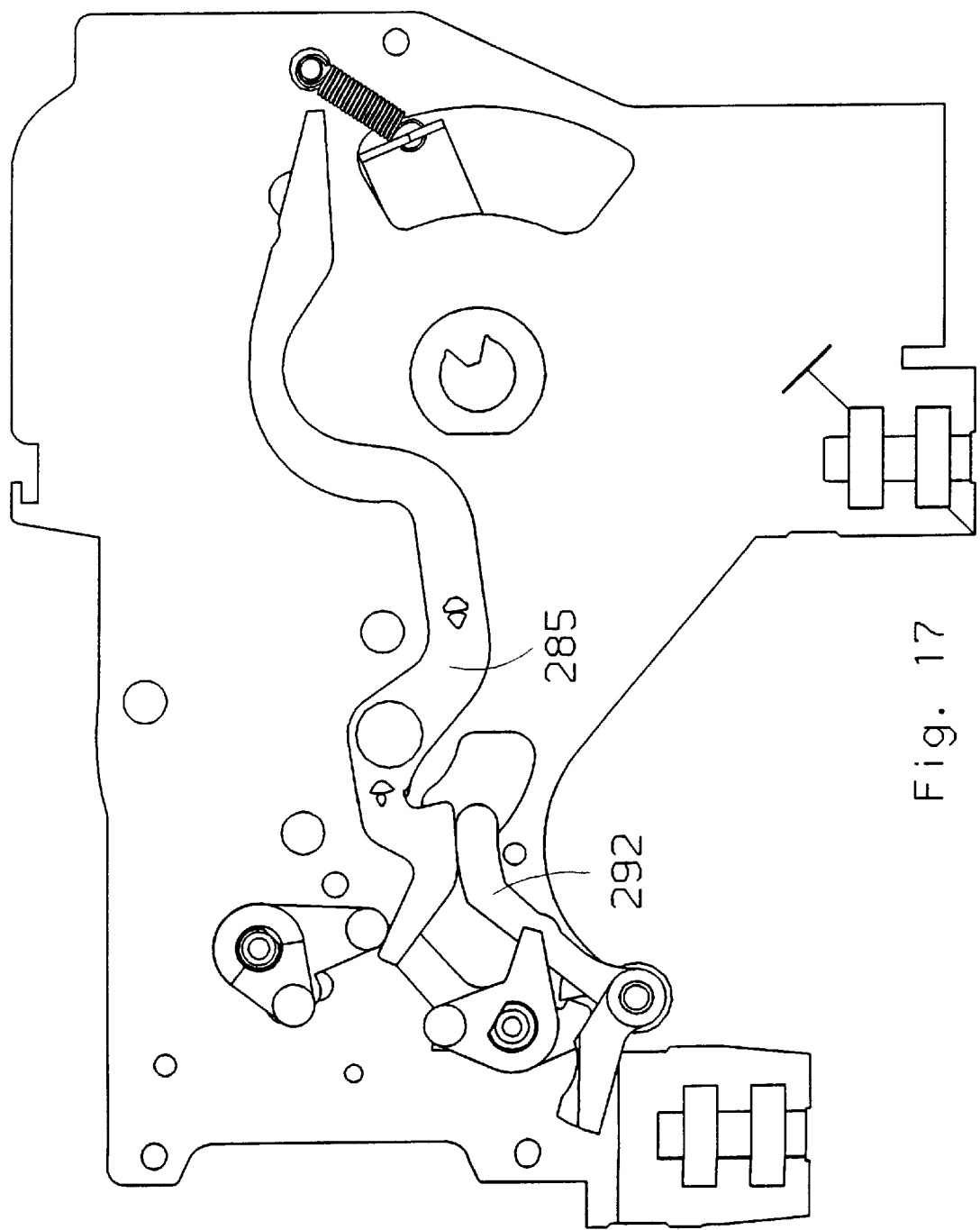
FIG. 17 is a schematic view of the third embodiment of the invention, with the single control lever in the opening control position.
Figure 18:
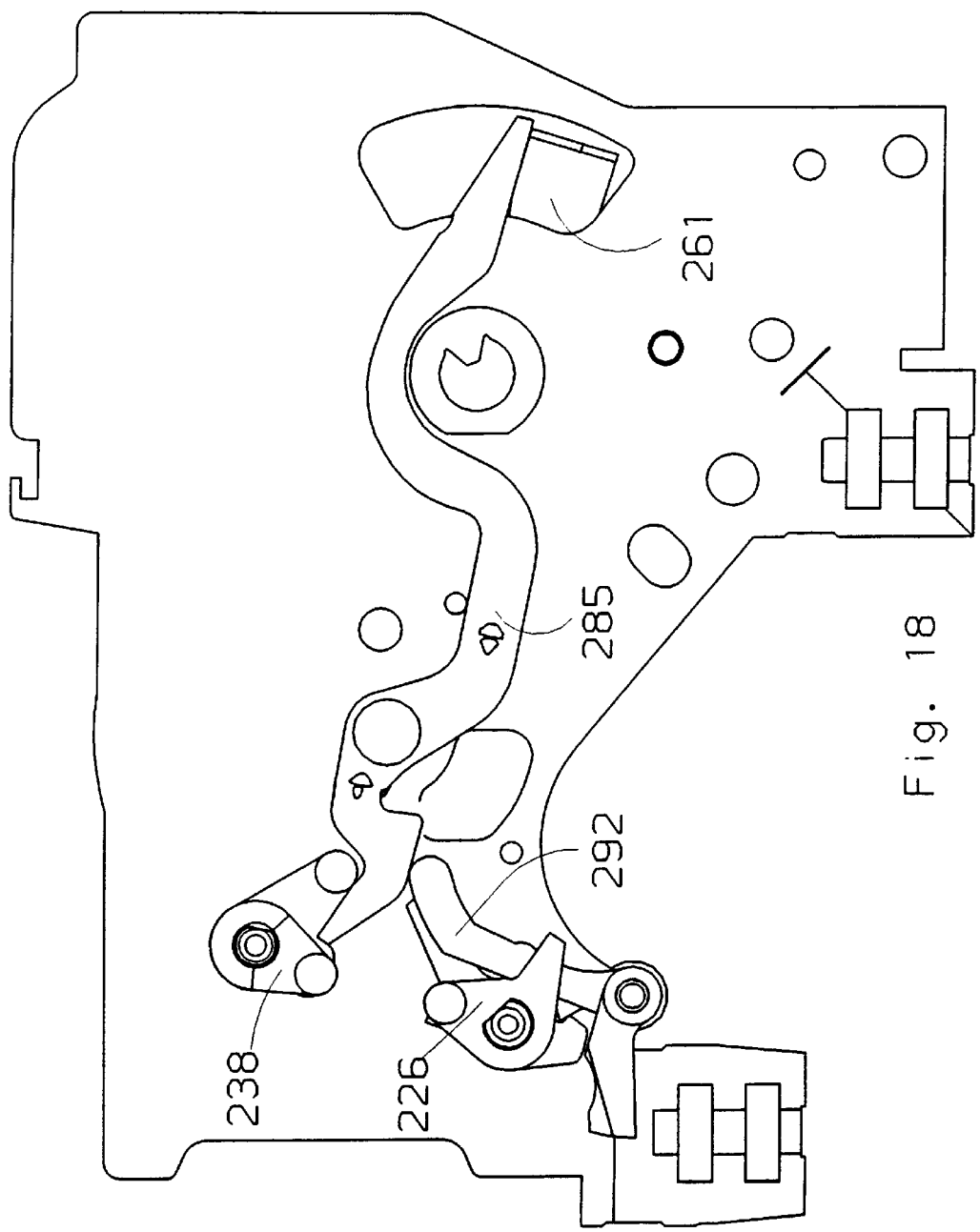
FIG. 18 is a schematic view of the third embodiment of the invention, with the single control lever in the closing control position.
Figure 19:
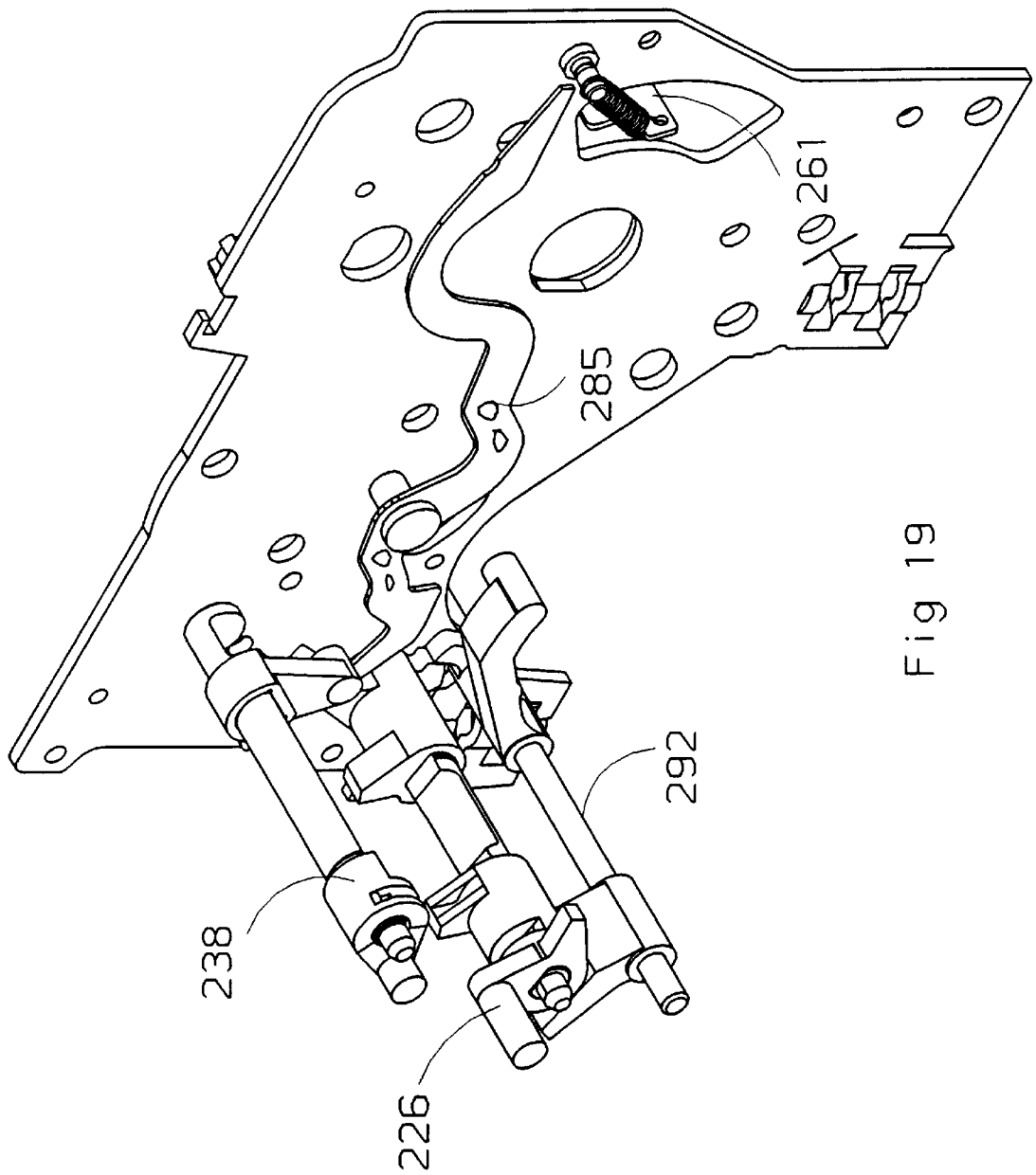
FIG. 19 is a perspective view of the third embodiment of the invention, showing more particularly a control mechanism comprising the single control lever.

An opening latch 226, a closing latch 238 and a trip mechanism 260 can be seen in FIGS. 16 and 19. A single control lever 292 is able to take an inoperative position, an opening control position and a closing control position, represented respectively in FIGS. 16 to 18. It is biased to the closing control position by a return spring. An intermediate lever 285 with three bearing surfaces is designed to operate in conjunction with the single control lever 292, the trip mechanism 260 and the closing to latch 238. FIG. 20 shows a part of the drive mechanism 240 and of the trip mechanism 260 which are similar to those of the first embodiment. The plate 262 of the ratchet cache 261 can in particular be seen between the rack wheel 242 and the drive ratchet 244. For the sake of clarity, certain elements have not been represented, in particular the ratchet return springs. It can be noted that the intermediate lever 285 is not provided with its own return spring, the return springs of the closing latch on the one hand and of the ratchet cache on the other hand proving sufficient.

In the neutral position (FIG. 16), the single control lever 292 does not interfere either with the opening latch 226 or with the intermediate lever 285. When moving to its opening control position, by pivoting in the counter-clockwise direction in FIG. 17, the single control lever cooperates via a spigot with the opening latch 226 and drives the latter to its unlatched position. When moving to its closing control position in the counter clockwise direction in FIG. 18, the single control lever 292 cooperates with the intermediate lever 285 and makes the latter pivot in the clockwise direction in the figure. The intermediate lever 285 thus almost simultaneously drives on the one hand the closing latch 238 to its unlatched position and on the other hand the plate 262 of the ratchet cache 261 to a position such that it is interposed between the drive ratchet 244 and the rack wheel 242.

Operation of the device is as follows. In the plugged-out position, the single control lever 292 operates in conjunction with a cam of the frame which holds it in an inoperative position against the biasing of its return spring. When the extraction sequence takes place from the plugged-out position, the single control lever 292 comes into contact with a first ramp of a cam securely united to the frame and pivots to its opening control position due to the biasing of its return spring. At the end of this first sequence, the circuit breaker is open, whatever its previous state may have been. When extraction is pursued, the single control lever 292 is released and is driven by its return spring to its closing control position. No-load closing of the circuit breaker then takes place and the plate 262 of the ratchet cache 261 is interposed between the drive ratchet 244 and the rack wheel 242. It is then impossible to reset the device.

This solution is sub-optimal compared to the previous one, as it does not prevent no-load discharge when extraction is performed. It does on the other hand prevent any reloading of the extracted switchgear apparatus, and therefore any risk of no-load discharge of the extracted switchgear apparatus. It also meets the requirements of protection of maintenance operators.

It is also possible on the basis of a device with a single control lever to perform an OCO sequence when extraction takes place, as in the device of the first embodiment. The modifications to be made to the device of FIGS. 16 to 20 to obtain this result have been illustrated schematically in FIG. 21. According to this embodiment, a single control means 390 comprises a single control lever 392 which can by pivoting counter-clockwise around its axis take four positions: an inoperative position, a first opening control position, a closing control position and a second opening control position. It is biased by a return spring to its second opening control position. A cam 393 in the form of a disk comprising two asperities 394, 395 each constituting two ramps at 45° is secured to the single control lever 392. These asperities are designed to operate in conjunction with a spigot 396 of the opening latch 326. For the rest, this embodiment is identical to the embodiment of FIGS. 16 to 20.

When the circuit breaker is in the plugged-out position, the single control lever 392 operates in conjunction with a surface of a cam fixed to the frame of the switchgear apparatus. When extraction takes place, the lever encounters a first ramp of this cam of the frame, which enables it to pivot to its first opening control position due to the biasing of its return spring. During this pivoting, the first asperity 394 of the cam 393 operates in conjunction with the spigot 396 of the opening latch 326 and makes the latch pivot to its unlatched position. At the end of this pivoting phase of the single control lever 392, the first asperity 394 is no longer in contact with the spigot 396 of the opening latch 326. The opening latch 326 is designed to reclose due to the biasing of its own return spring. When extraction of the circuit breaker is pursued, the single control lever 392 encounters a second ramp which enables it to pivot to its closing control position due to the biasing of its return spring. As in the third embodiment, this pivoting causes pivoting of an intermediate lever which almost simultaneously drives the closing latch and the ratchet cache. When extraction of the circuit breaker is pursued, the single control lever 392 is released enabling the second asperity 395 of the cam 393 to operate in conjunction with the spigot 396 of the opening latch in the same way as the first asperity, again causing unlatching and latching of the opening latch.

When the switchgear apparatus is moved from the extracted position to the plugged-out position, the sequence is reversed, each stage being in itself reversible.

Certain national usages do not prescribe an unloading sequence when extraction is performed. With the single lever devices of the second and fourth embodiments, it is still possible to comply with these usages. To do this a stop simply has to be provided on the circuit breaker restraining pivoting of the single control lever and preventing it from reaching the closing control position. It is thus possible to comply with different usages with an almost identical switchgear apparatus. The device according to the invention has a great flexibility of use and makes it possible to defer differentiation between the products intended for different markets.

Finally, certain alternative embodiments will be immediately apparent to the man of the trade. For example, it is clear that the control levers 82 and 92 can be replaced by any other mobile part supported by the circuit breaker 1, for example by pull-rods movable in translation.

What is claimed is:

1. A plug-in switchgear apparatus comprising: a fixed frame; a circuit breaker movable in the fixed frame between a plugged-out position and a plugged-in position, the circuit breaker comprising at least one pair of contacts at least one of which is movable with respect to the other between a closed position and an open position; a loading and closing mechanism, comprising a closing spring movable from a loaded state to a released state, the closing spring being associated to the movable contact so that relaxation of the closed spring drives the movable contact to the movable contact's closed position, a closing latch for latching the closing spring, in the closing spring's loaded state, a drive mechanism comprising a drive part, a coupling mechanism between the drive part and the closing spring, said coupling mechanism being movable from a coupling state in which actuation of the drive part moves the closing spring to the closing spring's loaded state, to an uncoupling state in which actuation of the drive part does not move the closing spring to the closing spring's loaded state.

2. The switchgear apparatus according to claim 1, wherein the circuit breaker is also movable relative to the fixed frame between the plugged-out position and an extracted position, the plugged-out position being between the plugged-in and the extracted position, the switchgear apparatus further comprising: a coupling mechanism control means for moving the coupling mechanism to the coupling mechanism's uncoupling state when the circuit breaker passes via an intermediate uncoupling position between the plugged-out position and the extracted position, in the extraction direction; a closing latch control means for driving the closing latch to the closing latch's unlatched position when the circuit breaker passes via an intermediate position between the plugged-out position and the extracted position, in the extraction direction, the intermediate uncoupling position being situated between the plugged-out position and the intermediate closing position, or being appreciably the same as the intermediate closing position.

3. The switchgear apparatus according to claim 2, further comprising: an opening mechanism, comprising an opening spring movable from a loaded state to a released state and from the released state to the loaded state, the opening spring being associated to the movable contact in such a way that relaxation of the opening spring drives the movable contact to an open position and that movement of the movable contact to the movable contact's closed position results in loading of the opening spring, and an opening latch for latching the opening spring in the opening spring's loaded state; and an opening latch control means for driving the opening latch to the opening latch's unlatched position, when the circuit breaker passes via a first intermediate opening position between the plugged-out position and the intermediate uncoupling position, in the extraction direction, and for driving the opening latch to the opening latch's unlatched position when the circuit breaker passes via a second intermediate opening position.

4. The switchgear apparatus according to claim 2, wherein the intermediate closing position and the intermediate uncoupling position are appreciably identical, further comprising a movable element common to the closing latch control means and trip mechanism control means said movable element being supported by the circuit breaker between a passive position and an uncoupling command position; and at least one cam common to the closing latch control means, said cam being supported by the fixed frame, the movable element operating in conjunction with an uncoupling command surface of the cam so as to move from the movable element's passive position to the movable element's uncoupling command position when the circuit breaker passes via the common intermediate closing and uncoupling position, in the extraction direction.

5. The switchgear apparatus according to claim 2, further comprising an opening mechanism, comprising an opening spring movable from a loaded state to a released state and from the released state to the loaded state, the opening spring being associated to the movable contact in such a way that relaxation of the opening spring drives the movable contact to an open position and that movement of the movable contact to the movable contact's closed position results in loading of the opening spring, and an opening latch for latching the open spring in the open spring's loaded state; an opening latch control means for driving the opening latch to the opening latch's unlatched position when the circuit breaker passes via a first intermediate opening position between the plugged-out position and the intermediate uncoupling position, in the extraction direction, a movable element common to the opening latch control means and to the coupling mechanism control means said movable element being supported by the circuit breaker between a passive position and an uncoupling command position, passing via a first opening control position situated between the other two positions; and at least one cam common to the opening latch control means and to the coupling mechanism control means, said cam being supported by the fixed frame, the movable element operating in conjunction with a first opening command surface of the cam in such a way as to move from the movable element's passive position to the movable element's first opening control position when the circuit breaker passes via the intermediate open position, in the extraction direction, the movable element operating in conjunction with an uncoupling command surface of the cam so as to move from the movable element's first open position to the movable element's uncoupling command position when the circuit breaker passes via the intermediate uncoupling position, in the extraction direction.

6. The switchgear apparatus according to claim 1, wherein the drive part is rotary; the drive mechanism comprises at least one free-wheel clutch for transmitting the movement of the drive part in one direction of rotation of the drive part and not to transmit the movement in the other direction of rotation; and the coupling mechanism in the mechanism's uncoupling state neutralizes said free-wheel clutch so that rotation of the drive part is not transmitted in either of the two rotation directions.

7. The switchgear apparatus according to claim 6, wherein the free-wheel clutch comprises at least one movable part movable between an engaged position in which the movable part enables transmission of the movement of the drive part and a disengaged position in which the movable part does not enable transmission of the movement of the drive part; and the coupling mechanism comprises a blocking plate for blocking said movable part of the free-wheel clutch in the disengaged position.

8. The switchgear apparatus according to claim 1, wherein the drive mechanism comprises: a rotary driven part, and at least one free-wheel coupling preventing rotation of the driven part in one direction, and wherein the coupling mechanism in the coupling mechanism's uncoupling state neutralizes said free-wheel coupling so that rotation of the driven part is possible in both directions.

9. A plug-in switchgear apparatus, comprising: a fixed frame, a circuit breaker movable in the fixed frame between a plugged-out position and a plugged-in position, the circuit breaker comprising at least one pair of contacts, at least one of which is movable and can take with respect to the other a closed position and an open position, a loading and closing mechanism comprising a closing spring movable from a loaded state to a released state, the closing spring being associated to the movable contact in such a way that relaxation of the closing spring drives the movable contact to the movable contact's closed position; a closing latch for latching the closing spring in the closing spring's loaded state; an opening mechanism comprising an opening spring movable from a loaded state to a released state and from the released state to the loaded state, the opening spring being associated to the movable contact in such a way that relaxation of the opening spring drives the movable contact to an open position and that movement of the movable contact to the movable contact's closed position results in loading of the opening spring, and an opening latch for latching the opening spring in the opening spring's loaded state; an opening latch control means for driving the opening latch to the opening latch's unlatched position when the circuit breaker passes via a first intermediate opening position between the plugged-out position and the extracted position, in the extraction direction; a closing latch control means for driving the closing latch to the closing latch's unlatched position when the circuit breaker passes via an intermediate closing position between the first open position and the extracted position, in the extraction direction, wherein the opening latch is designed to revert to the opening latch's latching position before the circuit breaker passes via the circuit breaker's intermediate closing position, in the extraction direction, and said opening latch control means is moreover designed to detect the fact that the circuit breaker passes via a second intermediate opening position between the intermediate closing position and the extracted position, in the extraction direction, and in this case to drive the opening latch to the opening latch's unlatched position.

10. The switchgear apparatus according to claim 9, wherein the opening latch control means is able to drive the opening latch to the opening latch's unlatched position when the circuit breaker passes via the intermediate second open position in the plug-in direction; the opening latch is able to revert to the opening latch's latched position before the circuit breaker passes via the circuit breaker's intermediate closed position, in the plug-in direction; the closing latch control means is able to drive the closing latch to the closing latch's unlatched position when the circuit breaker passes via the intermediate closing position in the plug-in direction; and the opening latch control means is able to drive the opening latch to the opening latch's unlatched position when the circuit breaker passes via the first intermediate opening position in the plug-in direction.

* * * * *